United States Patent
Thompson

(10) Patent No.: US 8,339,721 B2
(45) Date of Patent: Dec. 25, 2012

(54) TAPE DATA ASSESSMENT THROUGH MEDIUM AUXILIARY MEMORY DATA COMPARISON

(75) Inventor: Nathan Christopher Thompson, Boulder, CO (US)

(73) Assignee: Spectra Logic Corp, Boulder, CO (US)

(*) Notice: Subject to any disclaimer, the term of this patent is extended or adjusted under 35 U.S.C. 154(b) by 129 days.

(21) Appl. No.: 12/761,393

(22) Filed: Apr. 16, 2010

(65) Prior Publication Data

US 2011/0211273 A1 Sep. 1, 2011

Related U.S. Application Data

(60) Provisional application No. 61/170,046, filed on Apr. 16, 2009.

(51) Int. Cl.
*G11B 27/36* (2006.01)
*G11B 15/18* (2006.01)

(52) U.S. Cl. .......................................... 360/31; 360/69
(58) Field of Classification Search .................. None
See application file for complete search history.

(56) References Cited

U.S. PATENT DOCUMENTS

| | | | |
|---|---|---|---|
| 5,668,800 A | 9/1997 | Stevenson | |
| 5,883,864 A | 3/1999 | Saliba | |
| 6,269,330 B1 | 7/2001 | Cidon et al. | |
| 6,490,253 B1 | 12/2002 | Miller et al. | |
| 6,715,031 B2 | 3/2004 | Camble et al. | |
| 6,823,401 B2 | 11/2004 | Feather et al. | |
| 6,839,824 B2 | 1/2005 | Camble et al. | |
| 7,443,801 B2 | 10/2008 | Neidhardt et al. | |
| 7,492,720 B2 | 2/2009 | Pruthi et al. | |
| 7,573,664 B2 | 8/2009 | Bentley et al. | |
| 7,583,604 B2 | 9/2009 | Couturier | |
| 7,596,096 B2 | 9/2009 | Crawford et al. | |
| 2002/0006004 A1 | 1/2002 | Miyamura | |
| 2002/0055999 A1 | 5/2002 | Takeda | |
| 2003/0225865 A1 | 12/2003 | Koestler | |
| 2004/0078697 A1 | 4/2004 | Duncan | |
| 2004/0139195 A1 | 7/2004 | Feather et al. | |
| 2006/0092850 A1 | 5/2006 | Neidhardt et al. | |
| 2006/0126211 A1* | 6/2006 | Sasaki | 360/74.4 |
| 2006/0190205 A1 | 8/2006 | Klein et al. | |
| 2006/0238911 A1* | 10/2006 | MacKelden et al. | 360/69 |
| 2007/0025008 A1 | 2/2007 | Ballard | |
| 2007/0294591 A1 | 12/2007 | Usynin et al. | |
| 2008/0019283 A1 | 1/2008 | Emile | |
| 2008/0259809 A1 | 10/2008 | Stephan et al. | |
| 2009/0198737 A1 | 8/2009 | Sims | |

FOREIGN PATENT DOCUMENTS

| | | |
|---|---|---|
| EP | 726570 | 8/1996 |
| GB | 2419198 | 4/2006 |

* cited by examiner

*Primary Examiner* — Regina N Holder
(74) *Attorney, Agent, or Firm* — Kenneth Altshuler

(57) ABSTRACT

Methods for certifying data retained by a tape cartridge in a tape library are shown. Error rates that are encountered when the tape cartridge is being read by a tape drive can be accounted for without actually reading data for data content retrieval. A record of the error rate can be stored in a medium auxiliary memory device associated with the tape cartridge. An older record containing a formerly accounted for error rate of read errors when the tape cartridge was formerly read can be accessed and compared with the record presently assessed. If there is a difference between the presently found error rate and the formerly found error rate an action can be executed if the difference exceeds a predetermined threshold.

20 Claims, 19 Drawing Sheets

TAPE DATA ASSESSMENT THROUGH MEDIUM AUXILIARY MEMORY DATA COMPARISON

CROSS-REFERENCE TO RELATED APPLICATIONS

This application claims priority to and the benefit of U.S. Provisional Patent Application No. 61/170,046 entitled: Tape Cartridge Verification, filed on Apr. 16, 2009, the entire disclosure of which is hereby incorporated by reference.

BACKGROUND OF THE INVENTION

1. Field of the Invention

The present invention relates generally to tape libraries using auxiliary memory devices contained in tape storage cartridges to maintain information related to tape cartridge verification.

2. Description of Related Art

Data storage libraries, such as tape libraries, are typically used to store and retrieve large amounts of data for data manipulation and archiving purposes. These libraries are generally comprised of drive devices adapted to write data to and read data from tape cartridges that are often housed within the tape libraries. In the interest of obtaining cursory information about a specific tape cartridge without requiring a time-consuming media load and tape threading process to read the on-tape index file, techniques using holes arranged in patterns in the cartridge casing and later electrical pads grounded in a variety of combinations were introduced. The holes and/or electrical pads provided simple information such as the tape capacity and the manufacturer identity. Today, these techniques are yielding to the introduction of radio frequency chips located in the tape cartridges, called a Memory-In-Cartridge (MIC) also known as a Medium Auxiliary Memory (MAM). FIG. 1A shows an example of a tape cartridge 100, tape medium 102, and MAM 104 (shown here in dashed lines) The MAM 104 and tape medium 102 reside in the interior of the cartridge 100. In this example, the MAM is disposed in an LTO-3 cartridge which can be provided by TDK Corp. of Tustin, Calif.

A MAM allows the tape drive to access valuable cartridge data without the use of a physical connection, reducing connector wear for both the drive and the media. The MAM comprises a memory chip built into the data cartridge that provides a direct and immediate connection to the drive's on-board processors, which speeds access to information related to the data cartridge such as system logs, for example. Information and file search parameters are formatted within the MAM system thereby effectively cutting the data access time down to a fraction from historical techniques.

As shown in FIG. 1B, a MAM 104 fundamentally comprises an integrated circuit that includes solid state memory and a transponder 124 attached to an antenna 126, which is typically a small coil of wires. The MAM 104 is considered a passive device because it is energized when subjected to a sufficiently strong RF field, generated by a MAM-Reader. Information can be transmitted between the MAM and the MAM-Reader via a specific radio frequency.

Though a MAM is capable of storing data, the amount of data stored on a MAM is relatively miniscule compared to that stored on the tape medium 102. As such, a MAM device, in the exemplary configuration, cannot reasonably function as a backup device that stores duplicate data stored on the tape medium 102. Currently, data verification on a tape medium is done by comparing the data stored on a tape medium 102 with a duplicate copy stored on either a different tape medium or another storage device, such as a disc drive. Hence, if data is corrupt or missing because of damage to the tape medium, such as delamination of the magnetic thin film from the polymer tape substrate, damage due to contamination, or some other malfunction, knowledge of data corruption can be accomplished by comparing the data with the copy of the data. Unfortunately, maintaining a duplicate copy of data for the purposes of data verification is a resource-consuming approach.

In an effort to expand capabilities of a storage element containing a MAM operable for the purpose of improving data verification of tape cartridges 100, methods and apparatus are disclosed herein. It is to innovations related to this subject matter that the claimed invention is generally directed.

SUMMARY OF THE INVENTION

The present invention relates generally to tape libraries recovering data from a failed tape cartridge that are determined failed through data assessment analysis. One embodiment of the present invention contemplates a method certifying data, the method comprising: providing a library with a tape drive and a tape cartridge, the tape cartridge possessing a tape medium with data retained thereon and a medium auxiliary memory device wherein the medium auxiliary memory device contains a first record of first read error results; loading the tape cartridge in the tape drive; reading the data; assessing the data for read errors; determining second read error results; recording the second read error results on the medium auxiliary memory device; comparing the first read error results with the second read error results; establishing a numerical difference between the first read error results and the second read error results; executing a data recovery action of the data if the second read error results exceeds the first read error results and the numerical difference exceeds a predetermined threshold set by an end user.

Another embodiment of the present invention can therefore comprise a method for method for certifying data retained by a tape cartridge in a tape library, the method comprising: reading the data; assessing the quantity of the data that fails to meet a readability threshold; recording new results of the quantity to a medium auxiliary memory device associated with the tape cartridge; comparing the new results with former results of a former assessment, the former assessment ascertaining an former quantity of the data that failed to meet the readability threshold from an earlier time; establishing a numerical difference of the quantity and the former quantity; and executing an action if the numerical difference exceeds a predetermined threshold.

Yet another embodiment of the present invention can therefore comprise a method for certifying data retained by a tape cartridge in a tape library, the method comprising: accounting for an error rate of read errors encountered when the tape cartridge is being read by a tape drive wherein the tape cartridge is essentially not being read for data content retrieval; storing a record of the error rate in a medium auxiliary memory device associated with the tape cartridge; accessing an older record containing a formerly accounted for error rate of read errors when the tape cartridge was formerly read; comparing the record with the older record; determining if there is a difference between the error rate and the formerly accounted for error rate; executing an action if the difference exceeds a predetermined threshold.

DETAILED DESCRIPTION

U.S. Provisional Patent Application No. 61/170,046 entitled: Tape Cartridge Verification, filed on Apr. 16, 2009 is hereby incorporated by reference in the present Provisional U.S. patent application.

Before proceeding with the detailed description, it is to be appreciated that the present teaching is by way of example only, not by limitation. The concepts herein are not limited to use or application with a specific system or method for using MAM devices and Medium Lifecycle Management (MLM) data bases in tape library applications. Thus, although the instrumentalities described herein are for the convenience of explanation, shown and described with respect to exemplary embodiments, it will be appreciated that the principles herein may be applied equally in other types of systems and methods involving determining verification of tape cartridges.

Figure 2A:
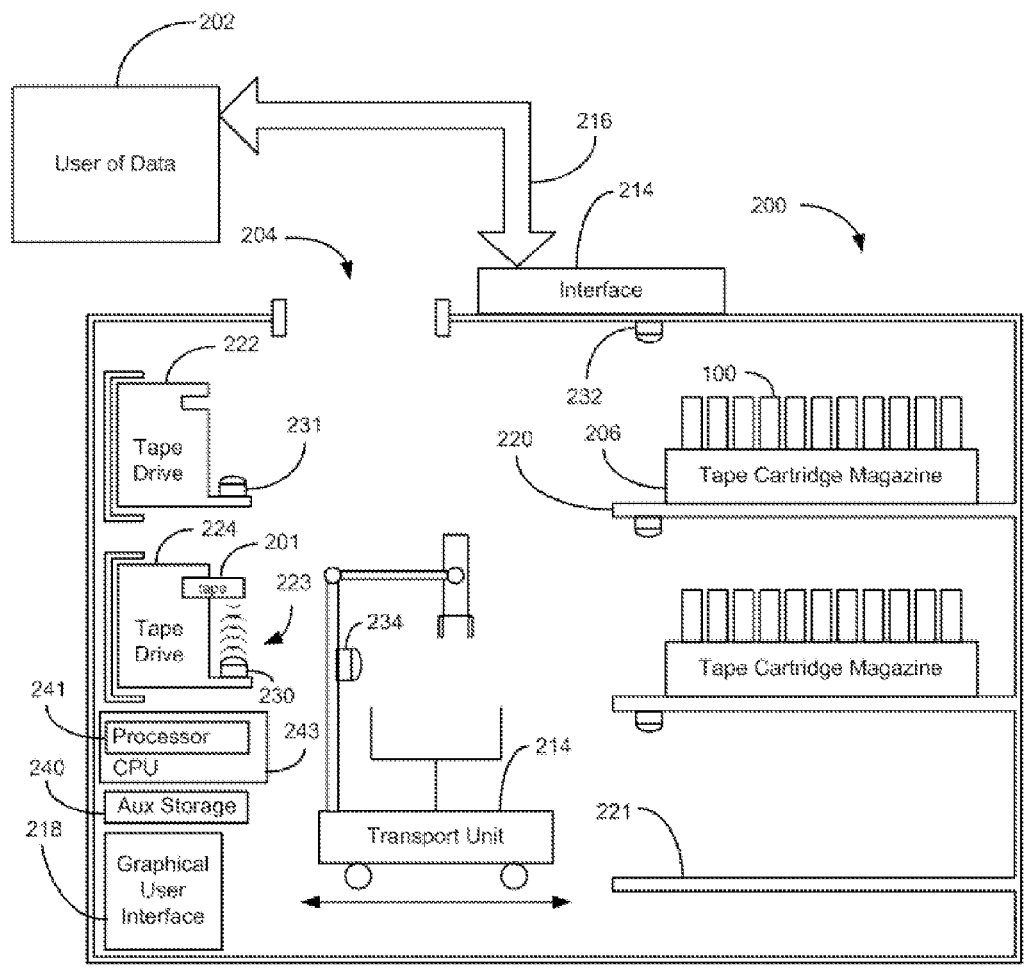
FIG. 2A is an illustration of a tape library arrangement in accordance with an embodiment of the present invention.

Referring to the drawings in general, and more specifically to FIG. 2A, shown therein is an illustration of a data storage arrangement constructed in accordance with an embodiment of the present invention. In what follows, similar or identical structures may be identified using identical callouts.

The data storage arrangement illustrated in FIG. 2A can comprise a user of data 202, such as a client, in communication 216 with a data storage library 200. As illustratively shown, the client 202 is in communication with the library 200 via the communication path 216 and a library interface device 214, which can be controlled by an independent controller (not shown) or a Central Processing Unit 243 (CPU). The library 200 comprises a plurality of tape cartridges 100 disposed in a tape cartridge magazine 206 wherein each of the tape cartridges 100 contains an auxiliary radio frequency memory device (not shown), such as the MAM 104 of FIG. 1B, capable of retaining auxiliary digital data. In alternative embodiments, the tape cartridges 100 can be disposed on shelves instead of magazines 206, as will be discussed in conjunction with FIG. 3A-3C. A MAM device 104 associated with a tape cartridge, such as the cartridge 100 or 201, for example, may be identified throughout the detailed description as element 104 even though it is considered to be contained by a cartridge and hence may not be viewable in a specific figure exemplifying embodiments of the present invention. Hence, the identification of element 104, used herein, is for illustrative purposes consistent with MAM device 104.

In this embodiment, the library 200 also comprises several tape drives 222 and 224, each capable of reading user data from and writing user data to one of the plurality of tape cartridges 100. User data, herein, is considered data from a source such as the user of data 202 that is intended for storage on the tape medium 102, of FIG. 1A. As shown, each tape drive 222 and 224 can be associated with a tape drive MAM device reader and writer 231 and 230, respectively. Each tape drive 222 and 224 is further capable of transmitting an access occurrence, such as date and time when the tape is loaded in a tape drive 222 and 224, to a MAM device 104 via the tape drive radio frequency memory device 230, for example. Access occurrence refers to approximately when a tape cartridge is loaded in a tape drive, such as tape drive 224, for purposes of reading or writing data for example (e.g., date and time, or a run time from T=0). In addition, load count (e.g., a running sum of each time a tape has been loaded in a drive) can be maintained by the MAM device 104 disposed in the tape cartridge 201. An example of a loaded tape drive is the tape cartridge 201 inserted in the tape drive 224 in a cooperating reading and writing relationship where user data can be stored and read from the tape medium 102 contained substantially by the cartridge 201. Reading and writing data to and from a tape medium 102 can also be referred to as "storage operations". As shown here, the loaded tape drive 224 is also in radio frequency communication 223 with the MAM device 104, which is associated with tape cartridge 201, via the tape drive MAM device 230, which is associated with tape drive 224. The tape drive 224 (as well as 222) is capable of transmitting date and time, or just date or time, to the MAM device 104 associated with the tape cartridge 201 when data is written to the tape or, optionally, each time the tape is loaded into the tape drive 224. Data is transmitted to the MAM device 104 via the tape drive MAM device reader and writer 230. In an optional embodiment, the MAM device reader is a device separate from the writer. An auxiliary storage device 240 can accommodate information, such as the access occurrence, from a plurality of MAM devices 104 each contained in an associated tape cartridge 100. The access occurrence from any MAM device 104 can be compared with the access occurrence from the associated tape cartridge 201 as stored in the auxiliary storage device 240 via a processor device 241.

The library 200 can further comprise a shelving system 220 capable of archiving the tape cartridge magazines 206 within the library 200. In this embodiment, the shelving system 220 is associated with one or more MAM device readers 232 that is at least capable of reading data, such as the access occurrence information, stored on an MAM device 104 contained by each tape cartridge 100. A transport unit 214 is an example of how a tape cartridge magazine 206 is moved from the shelf system 220 to a location that facilitates a tape cartridge 100 to be inserted in one of the drives 222 or 224 to form a cooperating relationship. The transport device 214 can optionally be associated with at least one MAM device reader 234, as shown here. The library 200 also optionally comprises an entry/exit port 204 whereby tape cartridges 100 or tape cartridge magazines 206 can be transferred between an environment external to the library 200 and an environment internal to the library 200. The MAM device readers 232 and 234 are independent of the tape drive MAM device 230, that is, devices 232 and 234 are disposed in locations independent of a tape drive, which are not associated with a tape drive. In this embodiment, the library 200 can accommodate a graphical user interface 218 and an auxiliary memory 240, which can be controlled by a memory controller (not shown), such as a disk drive or solid state memory device, capable of retaining (storing) relevant information related to each tape 100, such as that which is stored on a MAM device 104. In one embodiment, the tape cartridges 100 or the tape cartridge magazines 206 may be associated with different users of data such that the storage space in the library 200 is partitioned into two or more parts wherein each part is associated with the different user of data, for example.

General functionality can be controlled in the library 200 by the library Central CPU 243 over the Computer Area Network (CAN) (not shown). The CAN essentially connects all relevant components with the CPU 243. The CPU 243 is equipped with one or more controllers (not shown) coupled to the processor 241 (such as an Intel Pentium series processor manufactured by Intel Corporation of Santa Clara, Calif.) primary memory (not shown), such as flash memory, RAM, EEPROM, etc, secondary non-volatile memory (not shown), such as a hard disk drive (such as that produced by Seagate Corporation of Scotts Valley, Calif.). General data and algorithms can be maintained on the secondary non-volatile memory, for example, algorithms/computer instructions, operating systems, applications that run via cooperation with the processors, etc. The CPU 143 can further maintain, via the secondary non-volatile memory, the addresses of the components mapped out for the client 202 (e.g., tape slot addresses, drive addresses, robot addresses, etc.) to direct operations within the library 200. FIG. 2A is illustrative of basic components used to exemplify certain inventive embodiments disclosed herein. As one skilled in the art will appreciate, a data storage library will generally include devices and structures not shown in the block illustration of FIG. 2A, such as additional controllers, wiring, cooling systems, switch systems, lighting, protocol bridges, etc. Also, various library systems may contain multiple CPUs or divide up the functionality via both internal and external appliances, while still remaining within the scope and spirit of the embodiments described herein.

As one skilled in the art will recognize, the illustration of the library 200 in FIG. 2A shows the primary elements of interest for purposes of simplicity. As such, certain necessary structures and components for the aforementioned elements to properly function are omitted from the detailed description; however, such integrating structures and components do exist within the scope and spirit of the present invention. For example, in practice, the library 200 includes all of the necessary wiring, user interface panels, plugs, modular components, entry and exit port(s) to introduce (or remove) removable storage elements into the library 200, fault protectors, uninterruptable power supplies, processors, busses, robotic transport unit tracks, indication lights, and so on, in order to function as a data storage library.

Figure 2B:
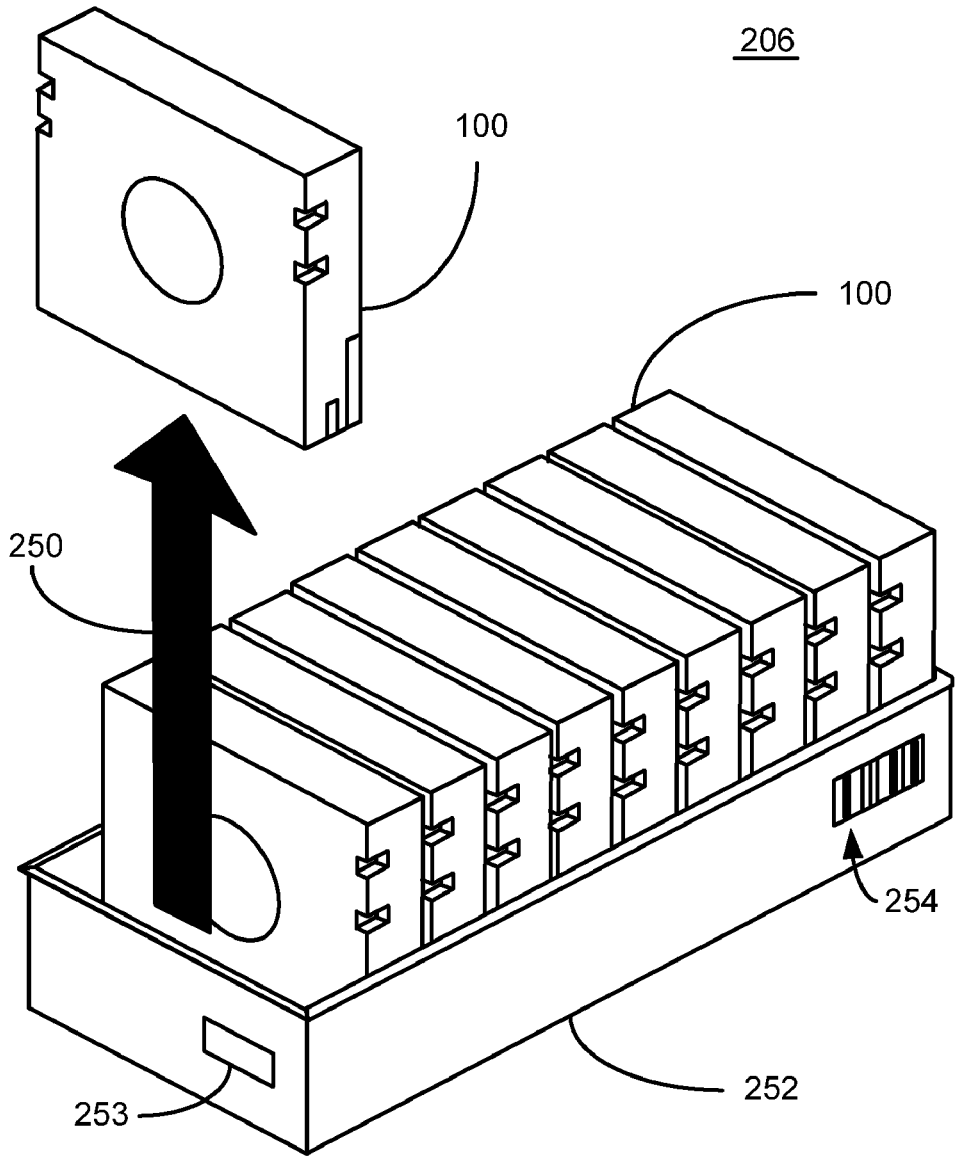
FIG. 2B is an illustration of a populated tape cartridge magazine in accordance with an embodiment of the present invention.

With reference to FIG. 2B, shown therein are tape cartridges 100 supported by a tape cartridge magazine 206. In more detail, a tape cartridge 100, such as an LTO-3 category tape cartridge manufactured by IBM, of Armonk, N.Y., comprises magnetic tape that is capable of storing digital data written by a compatible drive 220 or 224, such as an LTO-3 tape drive manufactured by IBM, when in cooperation to read and write data (i.e., loaded) with the tape cartridge 201, as shown in FIG. 2A. The tape cartridge magazine 206 is shown populated with a plurality of tape cartridges 100. A tape cartridge 100 can be removed from the tape cartridge magazine 206, as shown by the arrow 250, and inserted into the tape drive 220 or 224 by means of a picker device 502, shown in FIG. 5. Disposed on the tape cartridge magazine 252 is a bar code identifier 254 for identifying the tape cartridge magazine 206 which has utility should the tape cartridge magazine 206 be archived in a media pack storage vault externally located from the library 200, for example. In this embodiment, all tape cartridges 100 contain an MAM device 104, such as an auxiliary radio frequency memory device, however, in alternative embodiments, some tape cartridges may not contain an MAM device 104. In another embodiment of the present invention, the magazine 206 can comprise a magazine auxiliary memory device 253 that is capable of containing information from at least one of the data cartridges 100 the magazine 252 supports. The magazine auxiliary memory device 253 can receive information from the MAM devices 104 contained by each tape cartridge 100 via one or more MAM device readers 232 or 234, for example. Information from the MAM devices 104 can be read and immediately transmitted to the magazine auxiliary memory device 253, or alternatively, the information of each of the MAM devices 104 can be stored on the auxiliary storage device 240 and then transferred to the magazine auxiliary memory device 253, just to name two examples. In one embodiment, the magazine auxiliary memory device 253 can possess access occurrence information of every tape cartridge 100 associated with the magazine 206, which can serve a redundancy to the auxiliary storage device 240, of FIG. 2A.

A MAM device 104, in one embodiment, is an auxiliary radio frequency memory device, which is parceled into three regions in which data can be stored; a medium device region which contains information such as a serial number, a device region which contains information from the tape drive such as load count and access occurrence, and a host/vendor unique region wherein information such as history and/or performance data related to the cartridge 100 can be stored. Now information in the regions can be added via an address related to the arrangement of available storage space in the auxiliary radio frequency memory device or, optionally, the information can be read by an auxiliary memory reader, such as the reader 230, and reassembled with additional information and stored on the auxiliary radio frequency memory device as the reassembled version, just to name two examples. In another example, if the storage limit is reached in the auxiliary radio frequency memory device, such as the host/vendor data in the host/vendor unique region, the host/vendor data can be read and stored in an auxiliary storage space, such as the auxiliary memory 240, and the host/vendor unique region purged and made available for new information. In another example, the host/vendor data can be compressed with algorithms to decompress residing in the library 200 or user of data 202, for example.

Figure 3A:
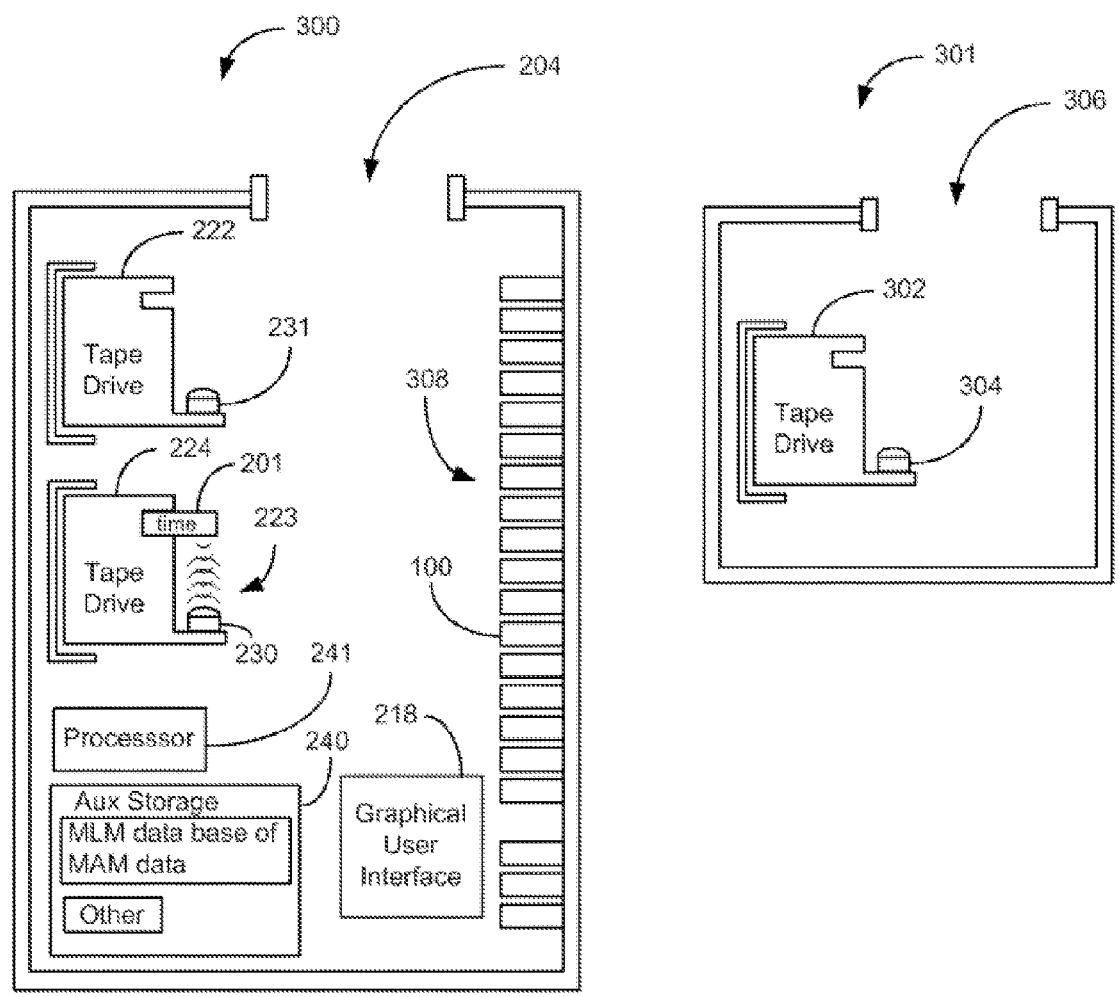
FIG. 3A-3C are illustrations of a tape cartridge being verified in different libraries in accordance with an embodiment of the present invention.

With reference to FIG. 3A, shown therein is an illustration of a first tape library 300 and a second tape library 301 possessing a tape drive 302 according to some embodiments of the present invention. As shown, the first tape library 300 comprises a tape cartridge 201 possessing an MAM device 104 that maintains access time and the date when loaded in a first tape drive 224. The first tape drive 224 possesses an auxiliary memory device reader and writer 230. The library 300 also possesses a second tape drive 222 with an associated auxiliary memory device reader and writer 231. The second tape drive 222 is shown not loaded with a tape cartridge 100. The library 300 also comprises a processing device 241 that is linked to both of the first and second tape drives 224 and 222 respectively and the auxiliary storage device 240. The first library 300 also possesses a graphical user interface 218 linked to the processor device 241 and, in one embodiment, the auxiliary storage device 240. The first library 300 also provides a shelf system 308 wherein tape cartridges 100 are moveably disposed. In one embodiment, the access occurrence associated with the tape cartridge 201 is updated each time the medium in a tape cartridge is threaded in a tape drive, such as the drive 224. In some cases, the access occurrence is recorded when the tape cartridge 100 has finished recording user data and is ready to be ejected. In both cases, when the tape cartridge 201 is loaded in the tape drive 224, the auxiliary memory device reader and writer 230 transmits an RF signal 223, for example, that records the access occurrence, which is, therefore, maintained in the MAM device 104 in what can be date and time (time stamp) or a time starting point (T=0) that can be monitored against a clock or other time keeping device. In another alternative embodiment, more than one previous access occurrence is maintained on the MAM device 104, such as just the previous one or two access occurrences, or, optionally, the entire history. The access occurrence is also transmitted to the auxiliary storage device 240 where it can be maintained in a Media Lifecycle Management (MLM) data base, stored therein. In one illustrative embodiment regarding a new tape cartridge 100; in the event the new tape cartridge 100 is introduced to the library 300, associated tape cartridge identification, such as a bar code, is logged into a library memory device, such as the auxiliary storage device 240, for example. Hence, the access occurrence on a newly introduced tape cartridge 100 is stored on the MAM 104 corresponding to the newly introduced tape cartridge 100 in addition to being stored in the auxiliary memory device 240. If the access occurrence is read from the MAM 104 and information on the MAM 104 indicates that the tape cartridge 100 was from a different library, and the tape cartridge has no history of being in the library 300, then the tape cartridge's identity is logged in the library 300 and the access occurrence is stored both on the tape's MAM 104 and in the auxiliary memory device 240 (e.g., when loaded with the tape drive 224 for the first time). In this example, the tape cartridge 201 is considered newly introduced into the library 300 and, thus, the access occurrence is written to the MAM 104 (exemplified herein as "time") that is associated with the tape cartridge 201.

In an optional embodiment, the original access occurrence associated with an incoming cartridge 100 may also be stored when loaded in a tape drive. Hence, if the access occurrence on a newly introduced tape cartridge 100 possesses a corresponding time and/or date, the newly introduced tape cartridge 100 information stored on its associated MAM 104 is retrieved from the MAM 104 and is stored in the auxiliary memory device 240. If the information on the MAM 104 differs from the auxiliary memory device 240 because the tape cartridge has been in a different library, then the information in the auxiliary memory device can be updated.

Figure 3B:
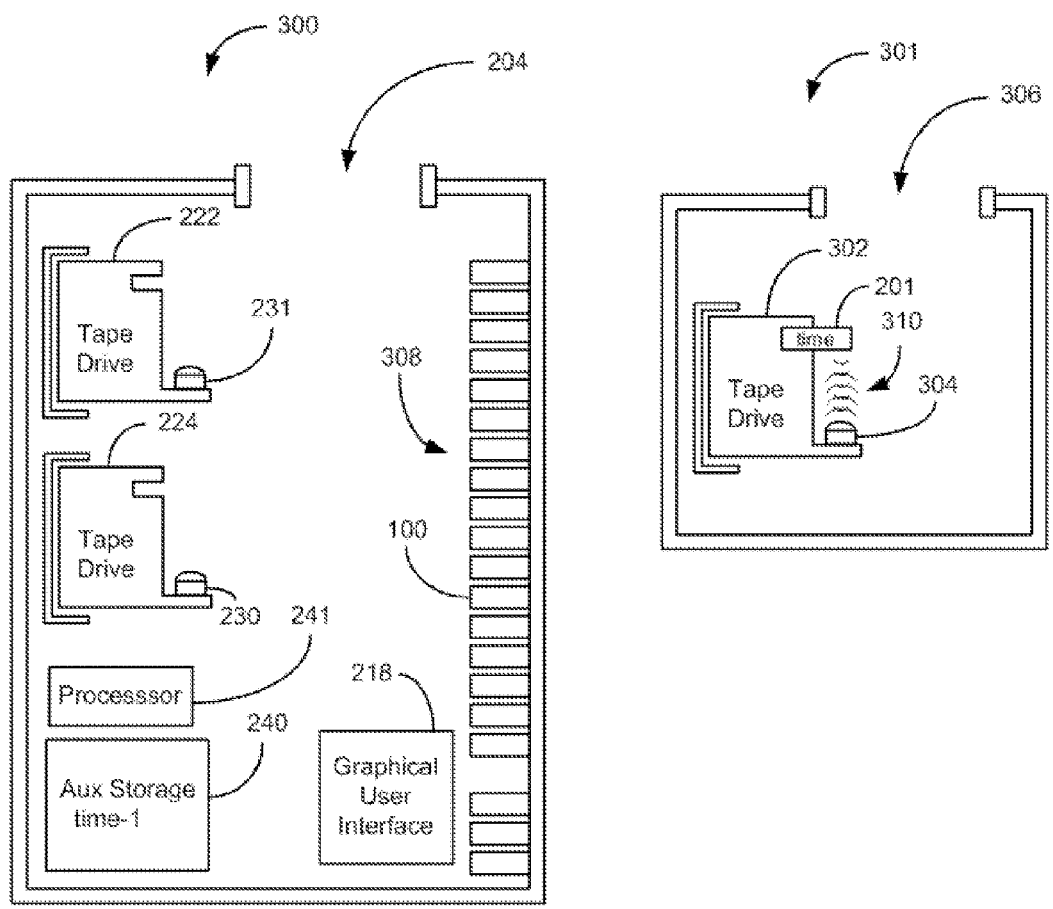

With reference to FIG. 3B, shown therein is the first library 300 and second library 301 wherein the tape cartridge is disposed in the second library 301. The tape cartridge 201 can be introduced to the second library 301 via the entry/exit port 306. As illustratively shown, the tape cartridge 201 is loaded in the tape drive 302, and the auxiliary memory device reader and writer 230 is shown transmitting an RF signal 310 that writes the present access occurrence to the MAM device 104. In an optional embodiment, the tape drive 302 does not have to be housed in the second library 301, but rather, can be a stand-alone drive not associated with any library.

Figure 3C:
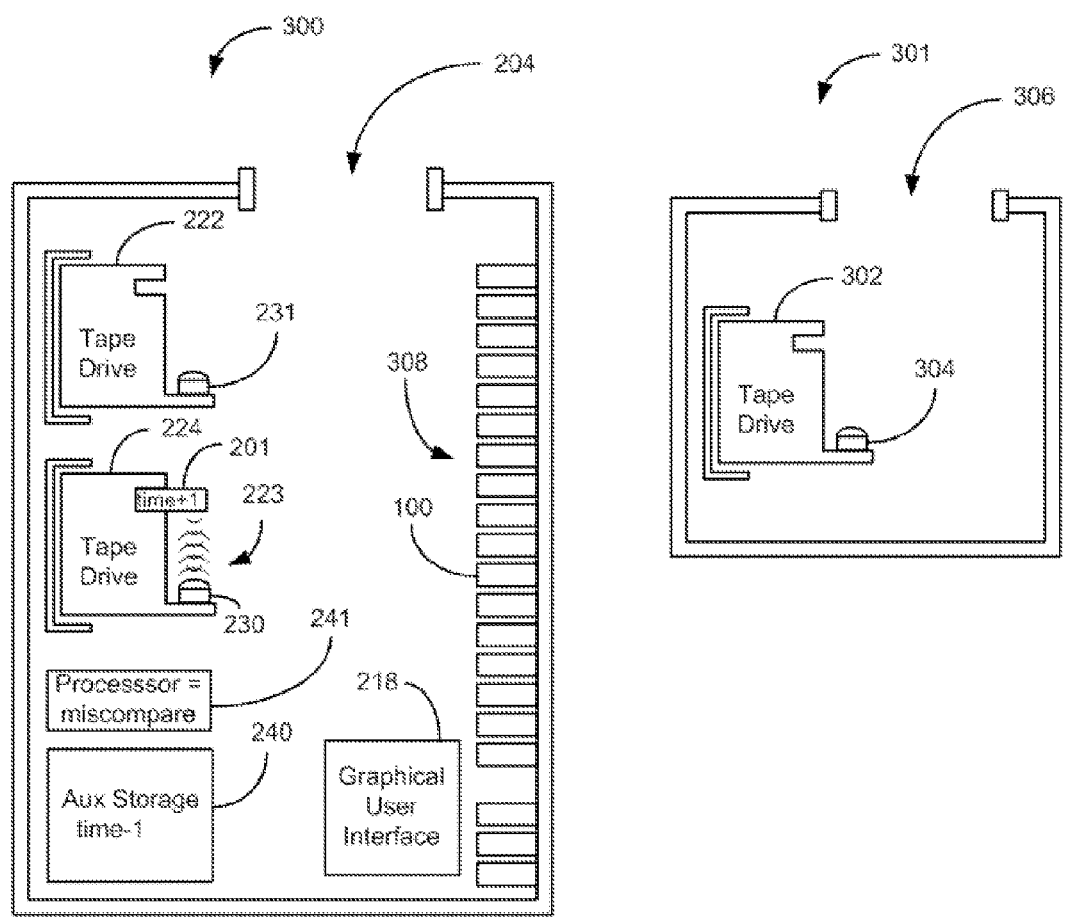

FIG. 3C illustrates the tape cartridge 201, once again, located in the first tape library 300. As shown, the tape cartridge 201 is disposed in the first tape drive 224. The recorded access occurrence associated with the tape 201 is read from the MAM device 104 associated with the tape cartridge 201 via the auxiliary memory device reader and writer 230 and transmitted to the processor device 241 wherein the processor device 241 receives the time from the previous access occurrence from the auxiliary storage device 240 for comparison. Because the access occurrence retained in the MAM 104 is not identical to the access occurrence maintained by the auxiliary storage device 240, a miss-compare is determined. A miss-compare is when the comparison of items are dissimilar (not the same). The access occurrence can equally be determined from the second tape drive 222 via the auxiliary memory device reader and writer 231. In one embodiment, the processor device 241 generates a user-specified action in response to the numerical discrepancy of different access occurrences of record. A user-specified action can be generated and executed by the processor device 241 or, optionally, an alternative device associated with the first library 300 may be capable of performing the function. A user-specified action is an action that is set in motion based on criteria that a user of data 202, or an operator, defines, for example. This criteria can be a threshold of time that has transpired from an access occurrence, for example, e.g., a time threshold for taking some action when a predetermined amount of time has passed since the previous access occurrence on the specific tape cartridge occurred. A user-specified action can further include preventing the tape cartridge 201 from leaving the library 300, such as by locking down the library 300 by preventing access to the entry/exit port 204, informing an end user, such as the user of data 202, that the access occurrence from the auxiliary storage device 240 is not identical to the access occurrence maintained by the MAM device 104 and letting the user of data 202 decide what to do next, disabling any user data stored on the tape cartridge 201, such as by eliminating access to an encryption key if the user data is encrypted, for example, or simply activating an audible and/or visual alarm alerting a user of data, or other authority, that the tape cartridge 201 has been loaded in a tape drive other than the authorized tape drives 222 and 224 associated with the first library 300. In such an event, a notification is sent to an end user, such as a user of data 202. The notification may be arranged to contain information that the tape cartridge 201 has been read by an external tape drive that is not associated with the first library 300. Such a notification can be viewable on a visual display device, such as a monitor accessible to the user of data 202. Optionally, the notification can be viewable on the graphical user interface 218 associated with the first library 300.

Figure 4:
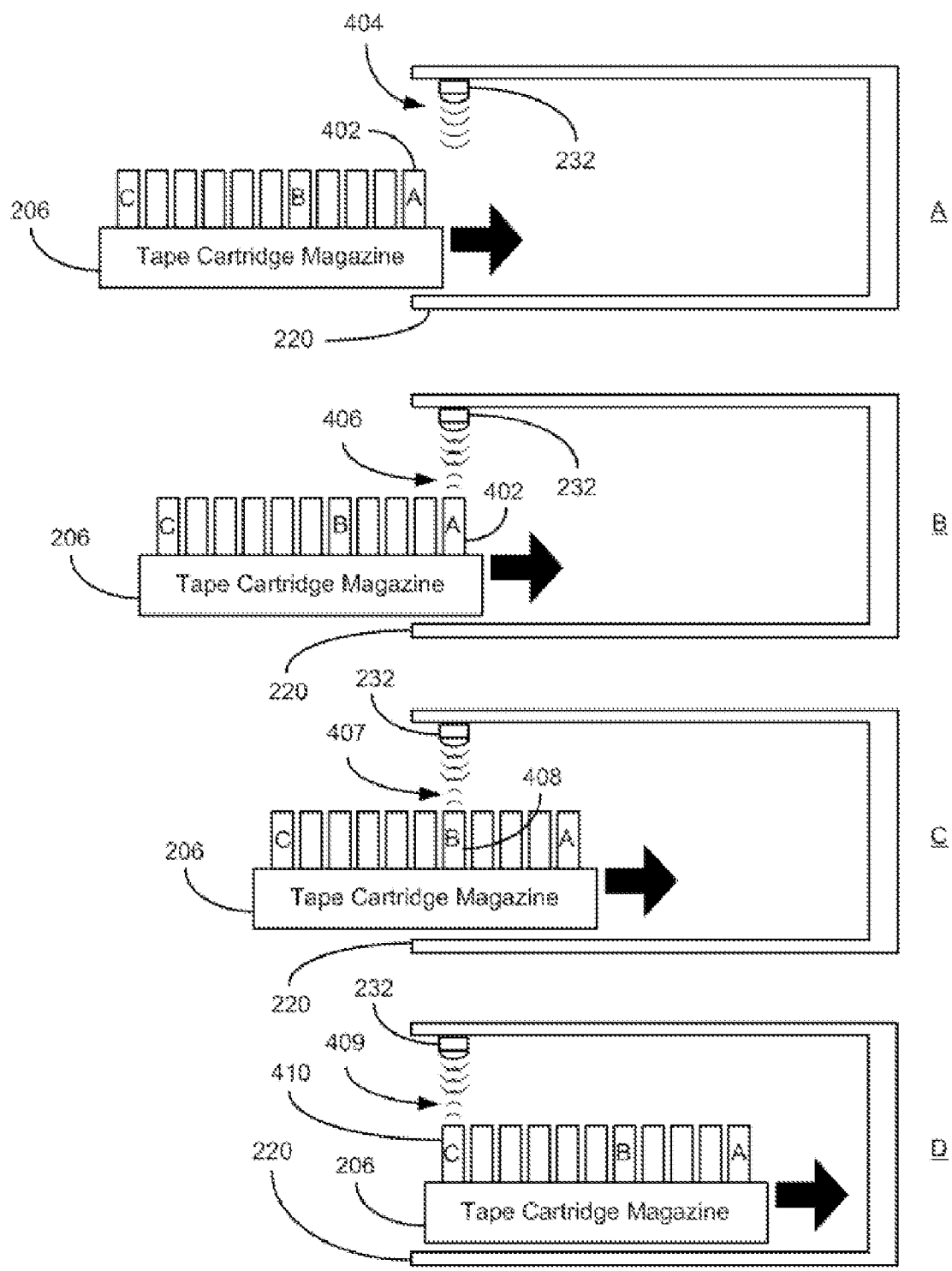
FIG. 4 is an illustration an embodiment of a shelf system that comprises an auxiliary memory reader that can be used in combination with a loaded tape cartridge magazine in accordance with an embodiment of the present invention.

FIG. 4 illustrates an embodiment of a shelf system 220 that comprises an auxiliary memory reader 232 that can be used in combination with a loaded tape cartridge magazine 206. As illustratively shown in arrangement-A, the tape cartridge magazine 206 is in the process of being moved onto the shelf 220 in the direction of the arrow. The auxiliary memory reader 232 is shown transmitting an RF field 404 via MAM device 104 (in this case, an auxiliary radio frequency memory device) contained in cartridge A 402. Arrangement-B illustrates the MAM device 104 contained in tape cartridge A 302 transmitting data, such as access occurrence information relative the history of loads associated with cartridge A 402, in the form of an RF signal 406 to the auxiliary memory reader 232 when positioned in the presence of the RF field 404. In one embodiment of the present invention, the auxiliary radio frequency memory device 104 is a passive device because it is energized when subjected to a strong enough RF field produced by the auxiliary memory reader 232. Information is transmitted between the MAM device 104 and the auxiliary memory reader 232 via a specific radio frequency, shown here as 404 and 406. Data can be transferred and stored on the MAM device 104 from the library 200 or alternatively (and in addition to) data from the MAM device 104 can be transferred to the auxiliary memory 240 via the auxiliary memory reader 232. Arrangement-C illustrates the MAM device 104 contained in tape cartridge B 408 transmitting data in the form of an RF signal 407 to the auxiliary memory reader 232 when positioned in the presence of the RF field 404. Arrangement-D illustrates the MAM device 104 contained in tape cartridge C 410 transmitting data in the form of an RF signal 409 to the auxiliary memory reader 232 when positioned in the presence of the RF field 404. The load information can be further stored on a magazine auxiliary memory device 253, of FIG. 2B, for every cartridge 100 populated in the magazine 206. In an optional embodiment, the auxiliary memory reader 232 can be linked with the processor device 241 and the auxiliary storage device 240, thus, providing access occurrence information for comparison that can be used as an alternative to the auxiliary memory device reader and writer 230 described in FIG. 3C.

Figure 5:
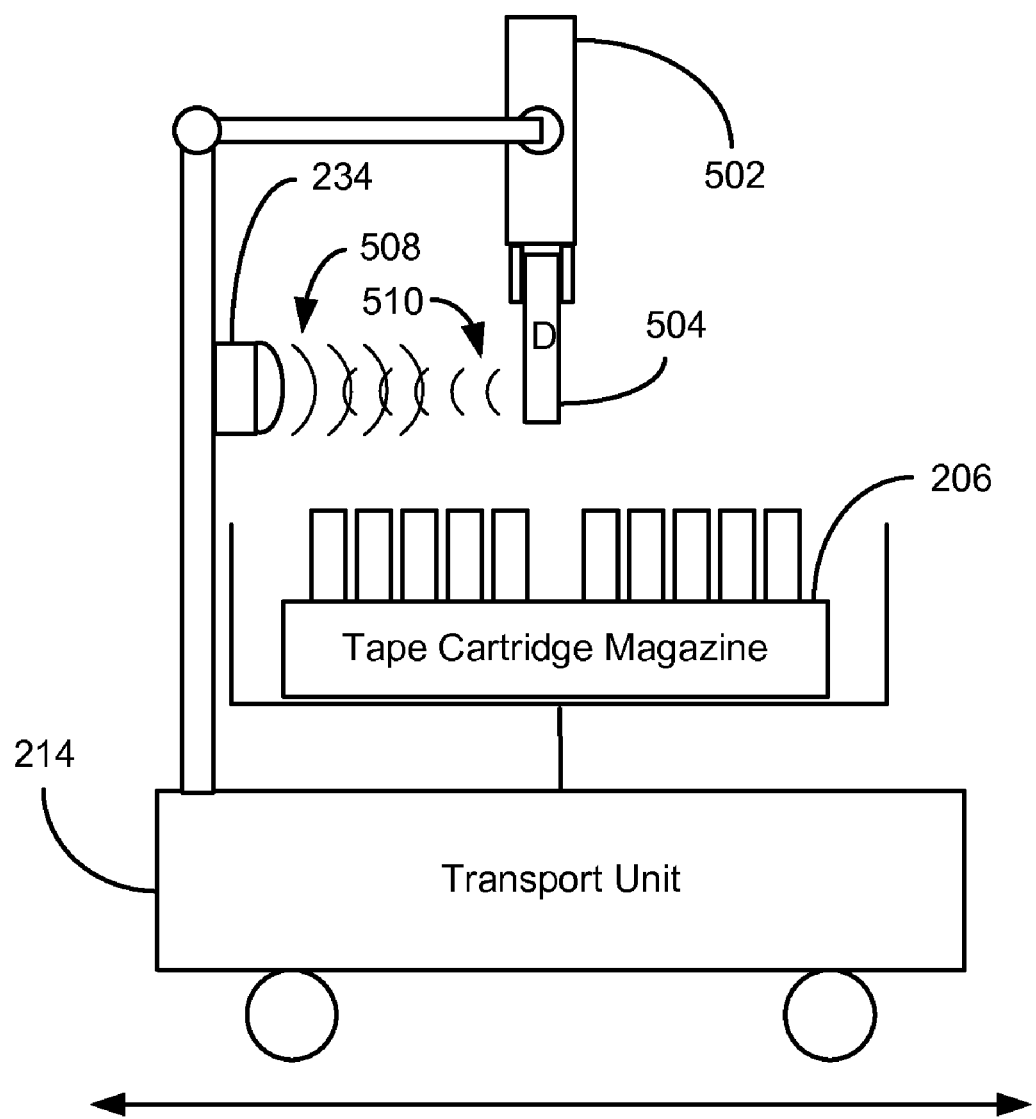
FIG. 5 is an illustration of a transport unit and auxiliary memory reader arrangement in accordance with an embodiment of the present invention.

With reference to FIG. 5, shown therein is an illustration of the transport unit 214, of FIG. 2A, in greater detail. The transport unit 214 is adapted to transport tape cartridge magazines 206 within the library 200. A cartridge picker 502, which can be associated with the transport unit 214, is adapted to move cartridges 100 from a tape cartridge magazine 206 into a cooperating read/write relationship with a tape drive, such as tape drive 224 of FIG. 2A. The transport unit 214 is illustratively shown accommodating an auxiliary memory reader 234 that is transmitting an RF signal 508 (and potentially data) to a MAM device 104 contained in tape cartridge D 504 whereby the MAM device 104 of cartridge D 504 is transmitting data, such as access occurrence information, via an RF signal 510 to the auxiliary memory reader 234. In an optional embodiment, the auxiliary memory reader 234 can be linked with the processor device 241 and the auxiliary storage device 240, thus, providing access occurrence information for comparison that can be used as an alternative to the auxiliary memory device reader and writer 230 described in FIG. 3C.

Figure 6:
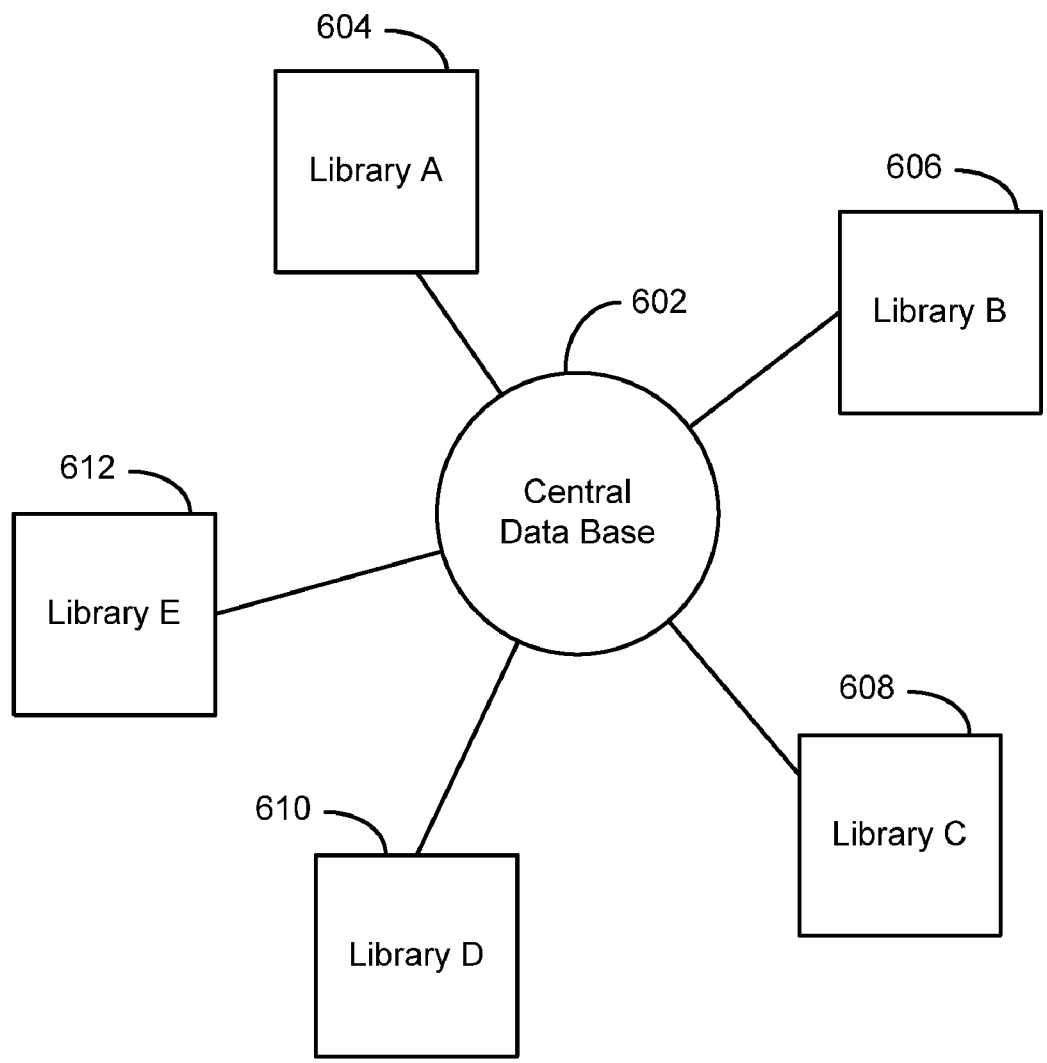
FIG. 6 is a block diagram illustrating a central data base acting as a repository for information pertaining to a plurality of tape cartridges in a plurality of libraries in accordance with an embodiment of the present invention.

FIG. 6 is a block diagram illustrating a central data base 602 acting as a repository for information pertaining to access occurrences for at least each tape cartridge associated with libraries A-E 604-612. As shown in the illustrative arrangement, library A 604, B 606, C 608, D 610 and E 612 are each linked to the central data base 602. The central data base 602 can provide storage of any, and all, MAM device information, including all information related to when access occurrences took place of all tapes associated with libraries A-E 604-612, contained in each tape cartridge associated with each library A-E 604-612. The central data base 602 can provide the function of the processor device 241 and auxiliary storage device 240 from FIGS. 3A-3C, thus generating a user-specified action if a time threshold has been reached for the elapsed time from an access occurrence associated with a specific tape cartridge that is housed in one of the libraries A-E 604-612. In other words, all of the tape drives of libraries A-E 604-612 are known entities and, therefore, each load occurrence is known on tape cartridges from libraries A-E 604-612. The MAM device information stored on the central data base can be viewed by an authority, such as an Original Equipment Manufacturer of libraries and/or tapes, for purposes of tape management.

Time from an access occurrence can be used, among other things, to update data, evaluate data or verify data, just to name several uses of access occurrence. In the case involving verifying data, data stored on a tape cartridge 100 may become lost or corrupt over time from damage to the tape cartridge 100 or tape medium 102 housed therein. For example, the tape medium may stretch over time, may delaminate over time, or may corrode over time, due to unfavorable environmental conditions, all of which will render the tape medium unreliable for effectively storing or maintaining data. Some indicators that data maintained on a storage medium is reliable include predictable data signatures, such as the signature of the data bits themselves, such as data bit amplitudes and signal shapes or an expected distribution of 1's and 0's, for example. In other words, reading data for predicted data signatures, as opposed to reading the data for content, is considered a reasonable predictor of data integrity. For example, determining data integrity based on the content of the data requires some comparison of the data to a known, similar, or duplicate copy of data. For example, an end user generally requires that data be read for content (e.g., a Word document). The content in a Microsoft Word document, for example, would be read and understood by an end user, however, a predicted data signature of the Microsoft Word document would be unrecognizable to an end user because it would just be an analysis of 1's and 0's, be it amplitude, Pulse Width 50 (PW-50), signal to noise ratio (SNR), data sampled with Error Correction Code (ECC), and the like, just to name several known methods of analyzing data signatures. Algorithms/programs that assess data in this way can be maintained in a hard disk drive, or other non-volatile memory, in the CPU 243 executed via a processor/s 241, for example.

Figure 1A:
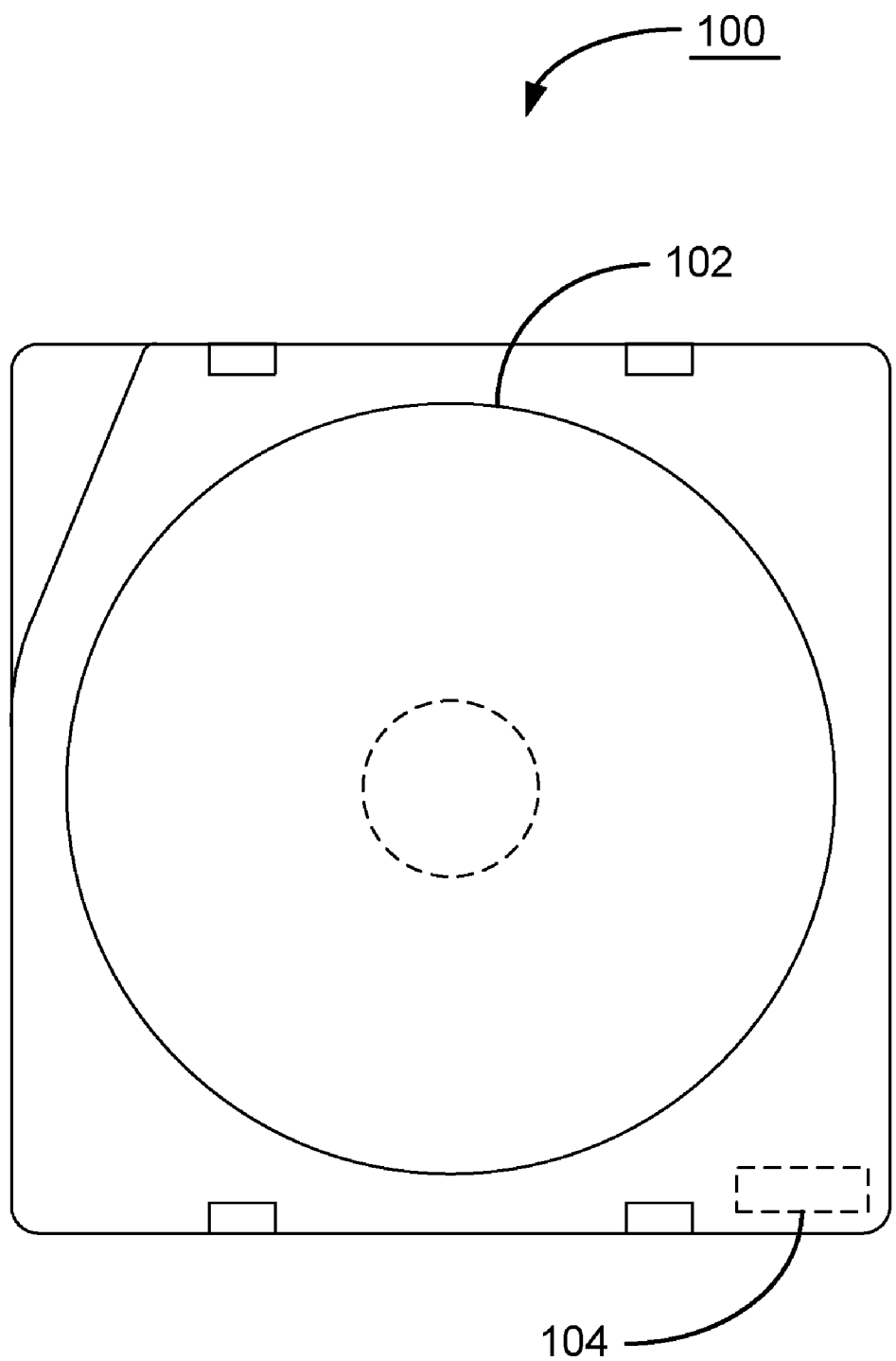
FIG. 1A is a prior art pictorial representation of a tape cartridge with an auxiliary radio frequency memory device.
Figure 1B:
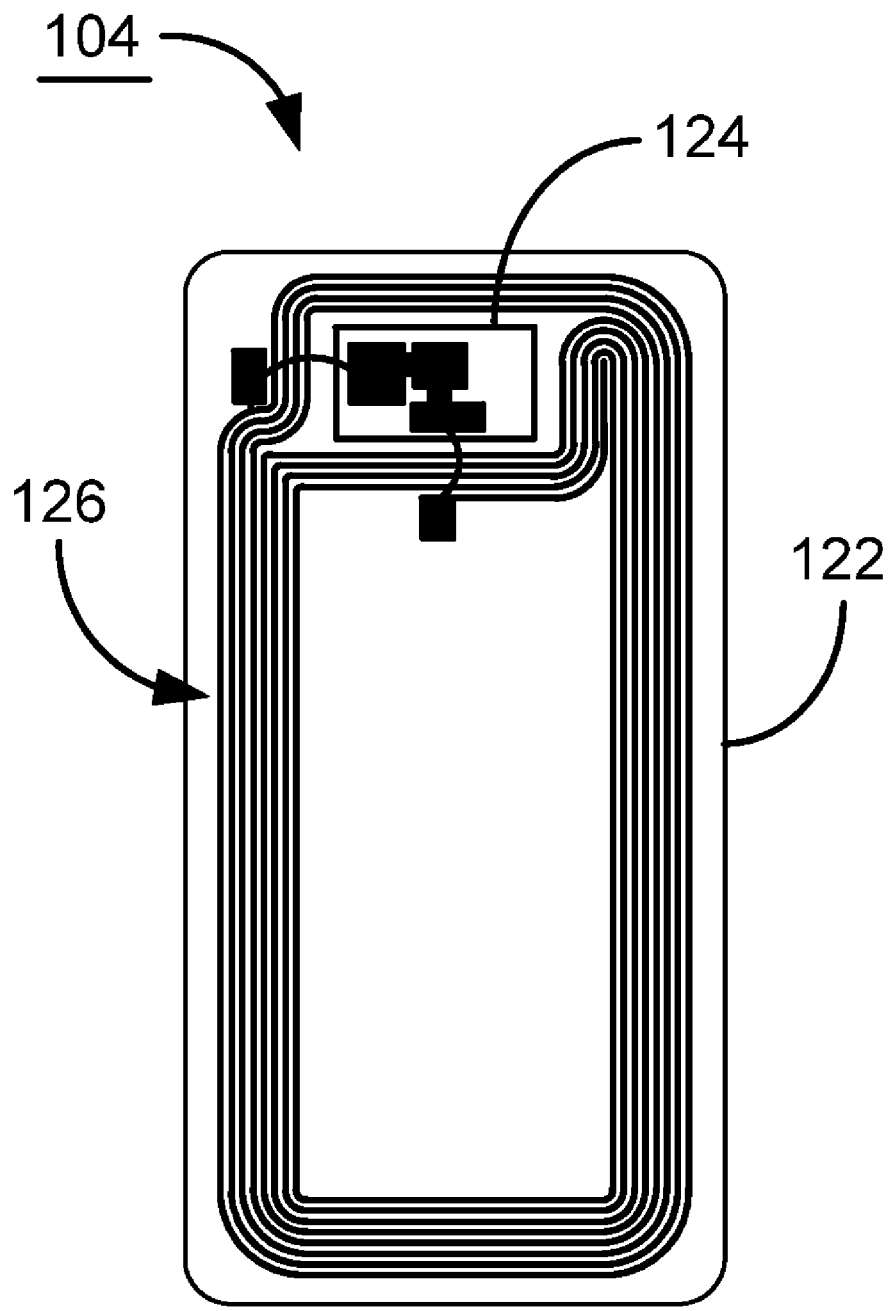
FIG. 1B is a prior art pictorial representation of an auxiliary radio frequency memory device.
Figure 7A:
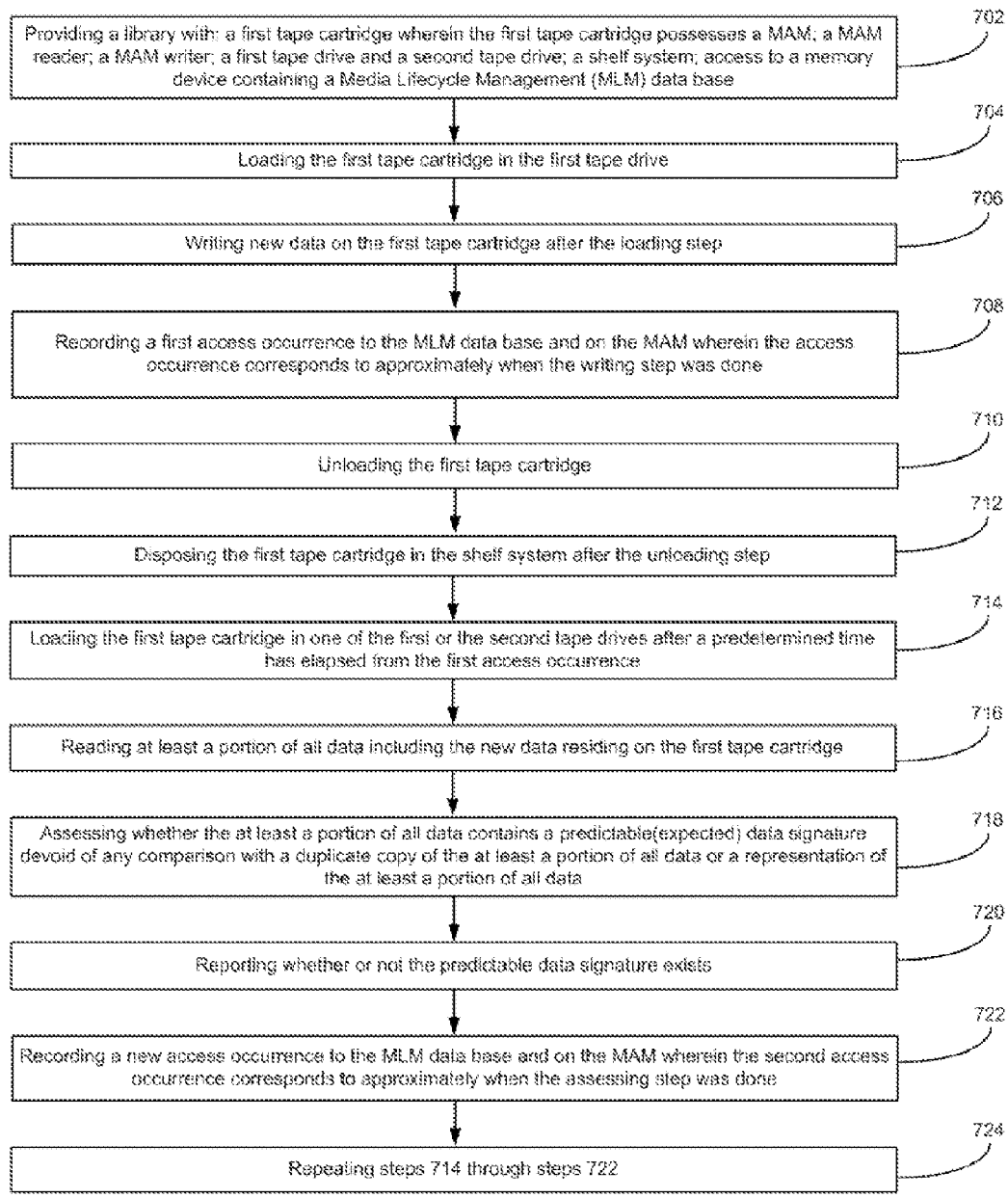
FIGS. 7A and 7B are block diagrams illustrating methods to practice embodiments of the present invention.

Referring now to FIG. 7A, shown therein is a block diagram illustrating method steps to practice an embodiment of the present invention. It should be recognized that the steps presented in the described embodiments of the present invention do not necessarily require any particular sequence unless otherwise specified explicitly. FIGS. 3A and 3B are used in conjunction with FIGS. 7A and 7B for purposes of illustration in the present described embodiment. The steps describe an embodiment consistent with the present invention of a method applicable to verifying data on tape cartridges using a cartridge's MAM 104 and an MLM data base which can contain identification information about a tape cartridge, such as a serial number, for example. The MLM data base can be maintained by an auxiliary storage device 240 as shown in FIGS. 1A and 2A. Data verification on a tape cartridge will not prove what content is stored on the tape cartridge, but rather, will simply prove that the media is functioning as expected and/or that the data stored on the tape cartridge is accessible prior to restoring data or storing new data on the tape cartridge. Performing in an expected manner is to perform according to pre established parameters wherein an end user, for example, can set the parameters for which the reading performance must meet at a minimum.

Step 702 shows a step for providing a library 200 that possesses: a first tape cartridge 201 possessing a MAM 104, a MAM reader 231, a MAM writer 231 (in this example the MAM reader and writer are integrated, however, optionally they can be separate devices located separately), a first tape drive 224, a second tape drive 222, and a shelf system 220. The library 200 has access to a memory device 240 containing an MLM database. The library 200 further includes the elements as discussed in conjunction with FIG. 2A.

Step 704 shows a step for loading the first tape cartridge 201 in the first tape drive 224. In the illustrative example of FIG. 2A, the first tape cartridge 201 is moved via a robot transport unit 214 that, in one embodiment, can carry a tape cartridge magazine 206 from the shelf system 220 to the drives 222 and 224.

Step 706 shows a step for writing new data on the first tape cartridge 201 in the first tape drive 224. In an illustrative embodiment, the library 200 receives new data from the user of data 202 (host) and transmits the new data to the first drive 224.

Step 708 shows a step for recording 223 a first access occurrence on the MAM 104 and on the MLM database maintained by the auxiliary storage device 240 wherein the access occurrence corresponds to approximately when the writing step was done. The access occurrence can be the date or the time, or both date and time, when the data was written. The point in time from when the access occurrence took place can be just prior to writing the data, during when the data is being written, or just after the data was written. Optionally, the point in time (time stamp) from when the access occurrence took place can be the day, week, month, etc. Hence, the last access date (occurrence) is stored on the MAM and can, in one embodiment, be overwritten by a new access date. Optionally, time stamps can include when data is read or if a tape cartridge is simply loaded in a tape drive for some other reason.

Step 710 shows a step for unloading the first tape cartridge 201 from the first tape drive 224.

Step 712 shows a step for disposing the first tape cartridge 201 in the shelf system 220 after the unloading step. The first tape cartridge 201 can optionally be disposed in a tape cartridge magazine 206 that, in turn, can then be disposed in the shelf system 220.

As shown in step 714, once a predetermined time has substantially elapsed from when the access occurrence was time stamped, the first tape cartridge 201 is loaded in either the first tape drive 224 or second tape drive 222, such as by the transport unit 214, for example. A predetermined function is something that is set, possibly by an end user prior to a selected event of action. The processor 241 is one optional device that can account for elapsed time from when the access occurrence was time stamped. Other clocks in the computer system or Computer Area Network associated with the library 200 can optionally account for elapsed time from when the access occurrence was time stamped. The library 200, and more specifically the library's computer system, or the like, can be set up with a predetermined time limit that can be inputted by an operator via the GUI 218 to execute a user-specified action, which, in this example, is a data verification option. Hence, the auxiliary memory device 240, which maintains the MLM database, can be queried by the processor 241, for example, to see when the first tape cartridge 201 substantially reaches the predetermined time limit. Optionally, the processor 241 can query the MLM database for all tape cartridges that possess an access occurrence time stamp and when their respective predetermined time limit has substantially been reached, the respective tape cartridge can be subject to the user-specified action. An operator can set the time limit via the GUI 218 wherein all the tape cartridges in the library 200 are on a schedule for data verification on a schedule, for example.

Once loaded, step 716 is a step for reading at least a portion of the data including the new data residing on the first tape cartridge 201 (a portion can include a first and second stream of data separated by a third stream of data that is not assessed, or just a singular portion of the entire data stream stored on a tape medium, for example). This is further elaborated on in conjunction with FIG. 7C. For example, all of the data including the new data can be read (from the beginning of the tape media 102 to the end) or, optionally, only small portions of the old data and the new data can be read. The portions can be random or in known intervals. Optionally, just file markers between data can be read. The tape medium can also be read at the beginning of the tape cartridge and then at some point later on the tape cartridge.

Step 718 is a step for assessing whether the at least a portion of all data contains a predictable, or expected, data structure devoid of any comparison with a duplicate copy of such portion of all data. In an optional embodiment, the predictable data structure is devoid of any comparison of a representation of the at least a portion of all data, such as a hash function, for example (a hash function is typically a mathematical function that converts a large, possibly variable-sized amount of data into a small datum, usually a single integer that my serve as an index to an array). An expected data structure is the predicted recorded structure of the data residing on the medium. For example, the residual magnetic impression of 1's and 0's retained in a magnetic medium can be sensed by a reading device and electrically converted into a signal that corresponds to the 1's and 0's. The order of 1's and 0's corresponds to the content of the information stored on the medium and the physical construct of the 1's and 0's, e.g., the signature of a pulse corresponding to a 1, corresponds to the structure of the residual magnetic impression retained in the magnetic medium. Accordingly, the structure of the residual magnetic impression and/or the approximate frequency of 1's and 0's are sufficient to determine the existence of data and that the data is intact from a structural point of view. Hence, an expected data structure of the digital information can be determined by assessing, or analyzing, the structure of the data. Optionally, the rough, or approximate, distribution of 1's and 0's, which form the structure of digital data, can also be used to assess the general health of the data on stored on the medium. If, for example, an aberrant distribution of 1's and 0's exist, e.g., just 0's or an occasional 1, concern may be raised. Optionally, both the structure of the 1's and 0's and the approximate distribution of 1's and 0's can be used to assess an expected data structure and health of the media. Methods of assessing expected data structure include, among other techniques, determining the number of read retries for both hard errors (data that cannot be read) and soft errors, errors that can be recovered, Error Code Correction techniques (ECC) typically associated with hard and soft errors, Pulse-Width 50 (PW-50) analysis, amplitude analysis, signal to noise ratio, or a combination of 2 or more of the aforementioned techniques, all of which are well known in the art. The data can be buffered and analyzed via an assessing technique, as discussed, to determine, or assess, if indeed the data exists as expected or if the data is missing, degraded, or inconsistent with what is expected. The analysis can be done by comparing a model of expected data outcome with the actual data read from the media. The expected data outcome can be all data falling within guidelines, such as upper and lower limits of acceptable outcomes. For example, if the ECC rate, or number of error code corrections in a given section of data, exceeds what is considered a normal number, or rate, of corrections, the tape cartridge can be deemed a failed tape cartridge, that is, a cartridge that is considered unreliable for storing data because it has reached a predetermined threshold of acceptable number of errors. This threshold can be calculated as a percentage of errors in a data set or simply a raw number of errors, for example. Optionally, a drive vendor can provide a command to determine the ECC rate, such as if the tape cartridge is read from end to end of the tape medium or just a portion thereon. The read data and error rates can be determined via a processor/s and algorithms (e.g., in the library CPU, for example) known to those skilled in the art run thereon. Therefore, assessing the number of hard and soft read errors, or the percentage of read errors, can trigger a tape cartridge to be deemed a failure if the number is considered excessive, that is, exceeds a predetermined threshold of what is considered acceptable of a properly/desirably/reliably functional tape medium. Optionally, the assessment on the expected data structure can be determined if an amount of the data fails to contain an expected data structure by frequency, degree, or other magnitude. The results of the data assessment can be stored in the library's auxiliary memory 240, for example, or in another storage location within the library.

Step 720 is a step for reporting whether or not the expected data structure exists. That is, the results of the assessment can be reported to an end user, a host 202, the GUI 218 associated with the library 200, a graphical display remote from the library 200, or some other location that can use the results. In the event the data of the first tape cartridge 201 is assessed to fall outside the guidelines of the expected data outcome, a warning can be issued to the end user, the host 202 or the GUI 218, for example, that the first tape cartridge 201 is unreliable. Optionally, the results of the analysis can trigger the library 200 to isolate the first tape cartridge 201, impose a restriction on any new data to be written to the first tape cartridge 201, or attempt storage of duplicate data relative to the first tape cartridge 201 from a duplicate data source, such as a RAID system or some other storage media that may contain duplicate data, discussed in more detail in conjunction with FIG. 7C. Optionally, data from the first tape cartridge 201 can undergo extreme data recovery procedures wherein any salvaged data can be stored onto a different (replacement) tape cartridge. The replacement tape cartridge can be mapped as the original, and the original can then be discarded. The replacement cartridge can assume some of the first tape cartridge's identity or essentially all of the first tape cartridge's identity, whichever is sufficient to be properly mapped to a host. The library can automatically initiate a data recovery sequence if the percentage or number or errors exceeds a predetermined threshold of allowable errors, for example. In an optional embodiment, an end user can initiate the data recovery sequence. The end user can input what the threshold or acceptable number or errors or percentage of errors for a given portion of data can be.

Step 722 is a step for recording a second access occurrence on the MLM data base and on the MAM 104 wherein the second access occurrence corresponds to approximately when the assessing step 718 was performed. This step essentially resets the time for the next data assessment (data verification) to repeat at a time interval set by an end user or the like. Hence, an operator, for example, can input that one or more tape cartridges are to be assessed for data integrity every six months (just to pick an arbitrary amount of time) on the GUI 218 or an external monitor, or optionally a host 202 can set the time between data integrity assessments. Each tape cartridge 100 possesses a corresponding identification, such as a serial number, maintained by the MLM data base which can be monitored to determine when each tape cartridge 100 is scheduled to be assessed for data integrity on a routine basis, such as every six months to use the example above. Upon reaching the scheduled time for data integrity assessment, a specific tape, such as the first tape cartridge 201, proceeds to steps 714 through 722 and the process is repeated.

In an optional embodiment, step 716 is accomplished by the first tape drive 224 or second tape drive 222, or more specifically, processors and algorithms running on the first tape drive 224 and second tape drive 222. Optionally, step 718 is accomplished by the first tape drive 224 or second tape drive 222. Optionally, step 720 can be accomplished when the first tape drive 224 or second tape drive 222 sends the assessment results to the means for reporting, such as a display monitor or paper printed by a printer, just to name several examples. Optionally, at least steps 716 and 718 can be accomplished by the first tape drive 224 or second tape drive 222.

Figure 7B:
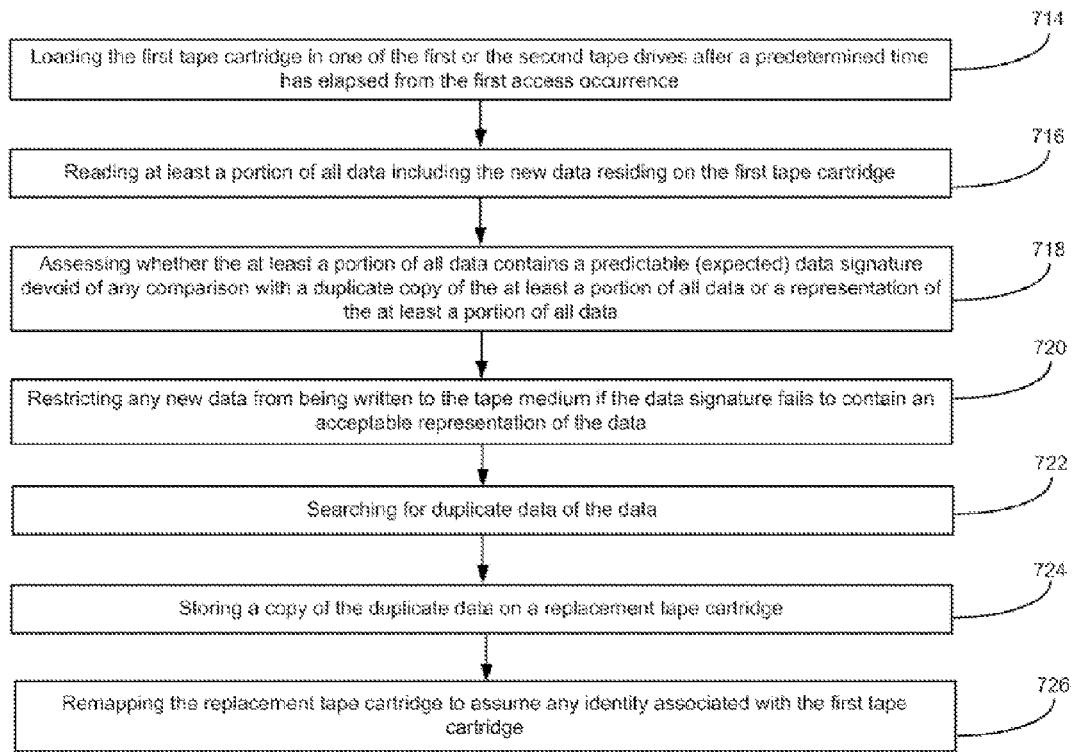
Figure 7C:
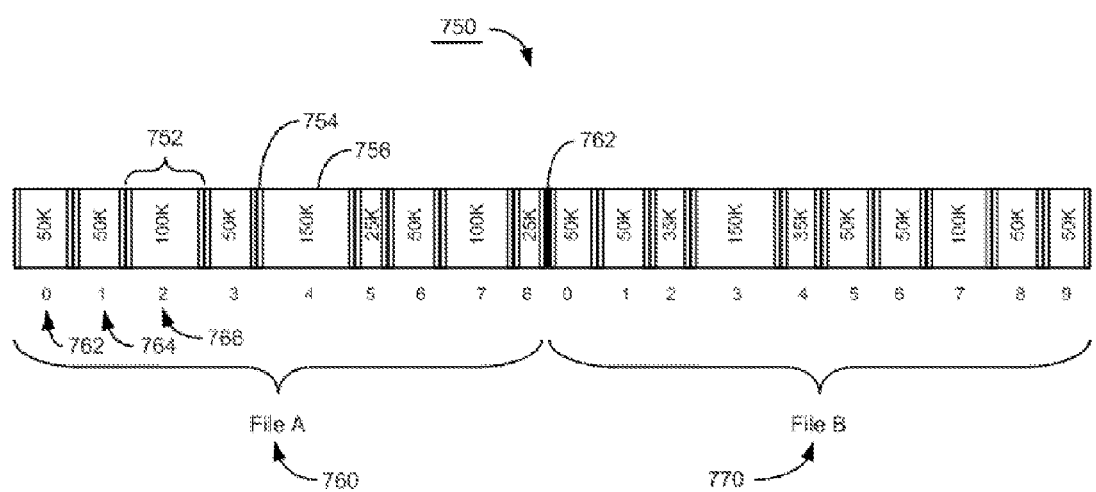
FIG. 7C is a block diagram illustrating a portion of tape medium formatted with streamed data consistent for tape related use.

FIG. 7B shows an optional embodiment of the present invention wherein a restriction is imposed for writing new data on the tape cartridge 201 and a duplicate data source is used to replace the "unreliable" data. FIG. 7B is additive to FIG. 7A. As shown in step 720, if the tape cartridge 201 is deemed unreliable (e.g., a failed tape cartridge), it is restricted from storing any new data on the tape medium 102 that resides therein. More specifically, if the data of the first tape cartridge 201 is assessed to fall outside the guidelines of the expected data outcome (for example, the data, or a portion thereof, on the tape medium 102 of the tape cartridge 201 fails to meet a minimum specified data reliability level), the library 200 can execute a series of instructions, via the CPU 243, that takes the first tape cartridge 201 off-line. A minimum specified data reliability level can be set via a predetermined limit. The predetermined limit, for example, can be a percent threshold of data having a data structure that deviates from the expected/predicted data structure. The predetermined limit can be related to how many read errors (hard and/or soft errors) were found in a given amount of data read. The predetermined limit can be a recommended limit set by a tape manufacturer, a library OEM, a host, or an end user that inputs the threshold in a program field displayed on the GUI 218, just to name a few.

Assuming the first tape cartridge 201 is a failed tape cartridge, step 722 is a step for searching for a duplicate copy of the data stored on the failed first tape cartridge 201. The duplicate data may be stored in a RAID system or another data storage library, for example.

If a duplicate copy of the data (identical data) from the failed tape cartridge 201 is found, step 724 is a step for storing a copy of the duplicate copy of the data, in its entirety, to a replacement tape cartridge. The replacement tape cartridge can be remapped with any and all addresses or identifications associated with the failed tape cartridge 201 and disposed in the slot (in the shelf system 308) previously occupied by the failed tape cartridge 201. The failed tape cartridge 201 can "tagged" as failed by recording that it has a failed status on an MAM 104 disposed in the failed tape cartridge 201. This way, the failed tape cartridge 201 can be readily determined as a failed cartridge quickly and easily without necessarily loading the tape cartridge 201 in a tape drive 224. Furthermore, a record of the failed tape cartridge 201 can be maintained on a database, such as the media lifecycle management database kept on the auxiliary storage device 240. The failed tape cartridge can then be taken out of commission by removal from the library or disposal in a location in the library allocated for failed tape cartridges.

Figure 8:
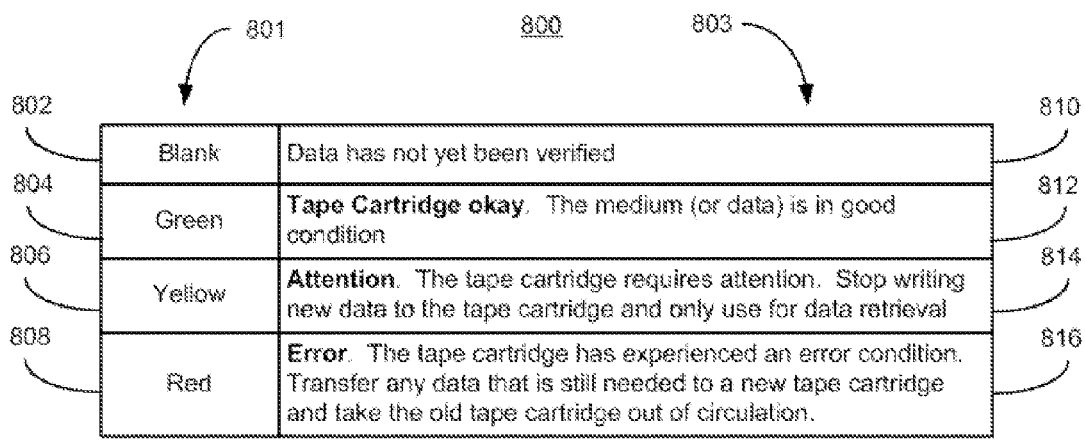
FIG. 8 is a block diagram of a reporting layout in accordance with an embodiment of the present invention.

One illustrative example of a reporting scheme, or layout, is shown in FIG. 8, which can report different levels of tape cartridge health. As illustratively shown, the results of the assessment can be reported in table 800. A status field 801 can be blank 802 indicating that data has not yet been verified 810. The status field 801 can be labeled "green" 804 indicating that the tape cartridge is in good shape wherein the medium is in good condition and/or the data is verified as being intact 812. The status field 801 can be labeled "yellow" 806 indicating that the tape cartridge requires attention. For example, a yellow status field 806 may further provide information to the end user or operator that any new data writing should be stopped and the tape cartridge should be used only for data retrieval purposes 814. The status field 801 can be labeled "red" 808 indicating that the tape cartridge is assessed as a failure 816. That is, the tape cartridge has been assessed as being in a failed condition and that transfer of any data should be to a new tape cartridge, not to the failed tape cartridge, and the failed tape cartridge should be taken out of circulation. If the data on the failed tape cartridge is the only data, attempts to transfer the data from the failed tape cartridge to a good tape cartridge may be the only option to save what data can be saved. Optionally, exceptional techniques, such as boosting signal output or applying special filters may be required to salvage the existing data on the failed tape cartridge. Optionally, tape cartridge health and percentage of errors can be retained on the tape cartridge's MAM device and/or MLM database 240.

In an optional embodiment, a tape cartridge can be read and verified as possessing expected data signatures and, once verified, the data can be duplicated to another source, such as another tape cartridge, hard disc drive, or other storage media or storage device.

In an optional embodiment to the method discussed in steps 702-720, an algorithm running on a processor associated with the library 200, or elsewhere, can be configured to monitor all the tape cartridges in the library 200 and anticipate when each tape cartridge will be scheduled for data verification of the data on each respective tape cartridge. This can be accomplished by accessing the time stamp information of each tape cartridge maintained in the MLM data base. Thus, an operator can set the time limit via the GUI 218 wherein all the tape cartridges in the library 200 are on a schedule for being assessed for data verification. The verification steps can be performed when the library 200 is idle or during a scheduled downtime, such as during the night, for example.

In yet another embodiment of the present invention, data can be assessed immediately after being written on the first tape cartridge 201.

In an optional embodiment, tape cartridge verification can be performed in a different drive than the drive from which data on a target tape cartridge was last stored. For example, with reference to FIG. 2A and FIGS. 7A and 7B, the first tape cartridge 201 is loaded in the first tape drive in step 702. The data on the first tape cartridge 201 is later assessed in step 716 on the second tape drive 222.

In yet another optional embodiment, the host 202 initiates and controls the tape verification method of FIGS. 7A and 7B. Optionally, a processor separate from the host 202 initiates and controls the tape verification method of FIGS. 7A and 7B. Optionally, the processor is part of the library 200 (e.g., comprised by the library). Optionally, the processor is a Quad Interface Processor (QIP) produced by Spectra Logic Corp., of Boulder, Colo. The QIP is substantially contained in the library 200. In yet another optional embodiment, an agent other than the host 202 can be added to initiate and control the tape verification method of FIGS. 7A and 7B.

In another optional embodiment, a separate library, be it a tape library, a disc drive library, a combination tape and disc drive library, a solid state array library, or a like mass storage device that possesses mass storage capabilities, initiates and controls the tape verification method of FIGS. 7A and 7B as an autonomous agent. Hence, a first library functions as a master library instructing a second library, or slave library, to perform tape verification. In an optional embodiment, the master library can control the specific functional commands associated with the tape verification steps of FIGS. 7A and 7B.

FIGS. 3A-3C are illustrations of a tape cartridge 201 being used in multiple libraries. FIGS. 3A-3C can be used to describe an embodiment of coping with a time stamp on an MAM that is different from that which is maintained in the MLM database when a tape cartridge is used in different libraries. As illustratively shown, in FIG. 3A the first tape drive 224 in a first library 200 writs to a tape cartridge 201. A time stamp, or the point in time when the data was written on the tape cartridge 201, is recorded both on a MAM associated with the tape cartridge 201 and in the MLM data base maintained by the auxiliary storage device 240. FIG. 3B shows the tape cartridge 201 being written to in a second library 301. In one embodiment, the auxiliary storage device 240 receives knowledge from the second library 301 that the tape cartridge 201 has been written to and a time stamp update is recorded in the MLM data base maintained by the auxiliary storage device 240. FIG. 3C illustratively shows the tape cartridge being accessed in the first tape drive 201 in the first library 300. In one embodiment, if the time stamp maintained by the MLM data base is different from that which is stored on the MAM in the tape cartridge 201 (e.g., the time stamp on the MAM is newer than the corresponding time stamp on the MLM database), then the MLM database will be updated with the time stamp corresponding to the MAM associated with the tape cartridge 201.

In yet another optional embodiment, tape verification can be performed while the library 200 is in full use via a global spare drive. The global spare drive is discussed in detail in U.S. application Ser. No. 12/407,919 which is incorporated herein by reference in its entirety. A global spare drive is a spare drive in a library that is available as a replacement drive should an active drive be taken "off-line". Because one or more global spare drives are idle, tape verification can be performed in the background using global spare drives so as not to interfere with the normal storage functions between a host computer and a library.

In one embodiment, tape drive use when verifying tape cartridges is balanced between multiple drives to offset wear to any one specific tape drive. For example, if there are four tape drives in a library, each tape drive verifies about 25% of the tapes so that no single tape drive is doing the majority of the reading. Optionally, the tape drives are verifying data at substantially an equal amount of time over a specific time period, such as a day, or a week, for example.

With reference back to FIG. 7C, a diagram is shown illustrating a typical layout of files saved on a section of tape medium 750 used in a storage system supporting tape media, such as the library 200. A tape library generally stores data in a linear manner as instructed by the streaming protocol from the host 202. Here, the data is stored on a tape medium 750 in the form of files, such as File A 760 and File B 770 separated by file markers 762. Herein, File A 760 and File B 770 are configured in a simplified construction. File A 760 comprises nine records 752, also known as logical data blocks, wherein each record 752 comprises meta data 754 and user data 756. The data size of each record 752 can be identical or, as shown here, variable for the entire file 760 as exemplified by record zero 762 having a size of 50K bytes, record one 764 having a size of 50K bytes, and record two 766 having a size of 100K bytes. In a tape configuration, the files 760 and 770 and records 752 generally run in sequential and contiguous order because of the linear access nature of tape. A host computer 202 using a streaming protocol generally makes data access requests for a storage system 200 in the form of files 760 and 770 and records 752 with commands, for example space forward so many files and space forward so many records (also known as blocks in SCSI, Small Computer Systems Interface, protocol). The storage system 200 generally searches for a file, such as file A 760, using file markers 762. For example, if a host 202 wanted to access file number fifty-two on a specific tape cartridge 201, for example, the tape cassette 201 containing the desired file number fifty-two would be scrolled forward from the beginning of the tape medium (not shown) and the number of file markers 762 would be counted until file marker number fifty-two was identified. If a host 202 wanted to access a record number seventy-four in file number fifty-two then file number fifty-two would be found as described and record number seventy-four would be found by reading the meta data 754 of one record 752 at a time sequentially until record number seventy-four was found. A record 752 of interest can be found by scrolling the tape cartridge forward or backward as necessary based on information about each record 752 stored in the meta data 754.

Hence, tape cartridges can be verified with different confidence levels such as if only a small portion of a tape cartridge tape medium is verified versus an entire tape cartridge tape medium. For example, the confidence levels of data integrity diminishes as the potion of tape medium assessed is reduced. Examples of portions of tape media assessments (such as assessed for errors) include only the beginning segment of a tape medium, a first and second data stream are assessed with a third data stream there between that is not assessed, etc. A stream of data is simply a portion of data that possesses least two bytes of data. Hence, a stream of data can be a logical data block 752, multiple data blocks 762 and 764, multiple files 760 and 770, etc. In another example, if only file marks 762 and meta data 754 are verified on a tape cartridge, or optionally, every 10 file marks 762 and meta data 754, the cumulative data on that tape cartridge can be assessed as performing within specification with less confidence than a tape cartridge that is assessed entirely from the beginning of a tape medium to the end of the tape medium. Other examples can include just assessing file marks 762, random logical data blocks 754, logical data blocks 762 and 776 separated by one or more data blocks 764 not assessed, etc. The advantages of assessing small samples of data dispersed across a tape medium are time savings and wear to the drives, for example.

In another optional embodiment, some or all tape cartridges can be scanned and assessed, as described in conjunction with FIGS. 7A and 7B, before they are used for backup applications. For example, a company may backup all storage in its main server at midnight every night. The tape cartridges that will be used for the backup can be assessed prior to backup. As such, some tapes can be confirmed as blank, or having no data, while others can be confirmed as possessing data. The ones possessing data can be overwritten or simply continued where the tape medium is blank. The ones possessing data can be verified as in good condition; that is, they are capable of storing data with reasonable confidence that the data stored thereon will be preserved. The results can be transmitted for the company to review.

In yet another aspect of the present invention, a tape cartridge can be determined to possess normal functionality prior to being used as a backup in what is essentially a pre-use verification. For example, a tape cartridge possesses mechanical parts (or components) such as a tape medium access door, locking mechanisms, at least one tape reel, leader, tape medium, just to name several mechanical parts. Though these components are assumed in working order when initially introduced in a tape library, there may be some tape cartridges that are faulty causing costly time delays when a host computer is attempting to store or retrieve data. In one embodiment, prior to ever using a tape cartridge, a pre-use verification can be performed to verify that a tape cartridge is functional from a mechanical perspective. Optionally, pre-use verification can be performed at any time to assess mechanical functionality of one or a group of tape cartridges. Furthermore, a pre-use verification can determine if a tape cartridge used to store data is indeed a tape cartridge used to store data and not a cleaning tape used for cleaning the heads on a tape drive. Moreover, a pre-use verification can determine that the tape cartridges being installed are, in fact, the appropriate tape cartridges usable with the library, for example, capacity, tape model, drive compatibility, and the like.

Figure 9:
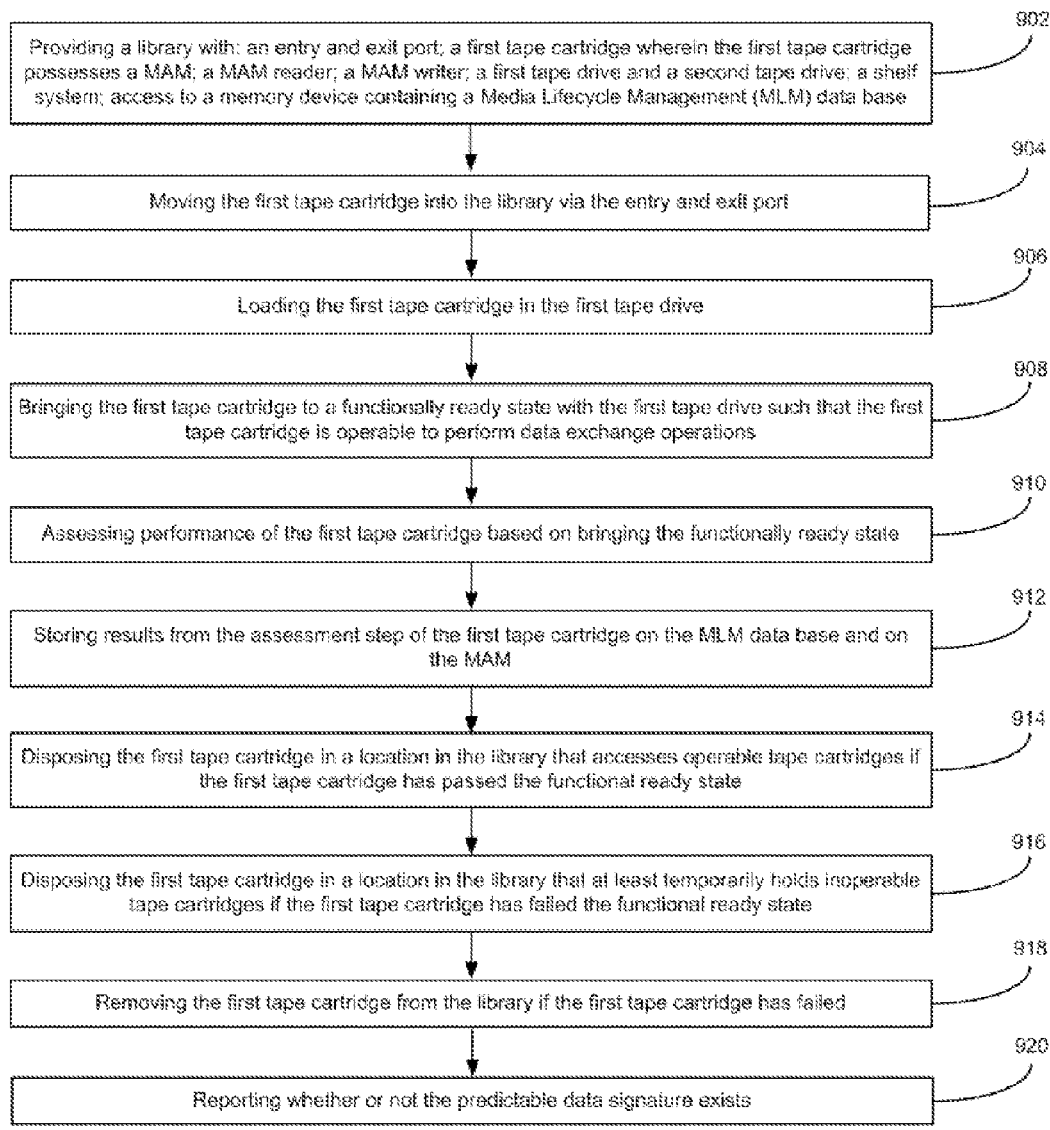
FIG. 9 is a block diagram illustrating an alternative method to practice an embodiment of the present invention.

Referring now to FIG. 9, shown therein is a block diagram illustrating method steps to practice an embodiment of pre-use verification consistent with embodiments of the present invention. It should be recognized that the steps presented in the described embodiments of the present invention do not necessarily require any particular sequence unless otherwise specified explicitly. FIG. 2A is used in conjunction with FIG. 9 for purposes of illustration in the presently described embodiment. The steps describe an embodiment consistent with the present invention of a method applicable to verifying the mechanics of tape cartridges and recording information on a cartridge's MAM 104, an MLM data base, or both.

Step 902 shows a step for providing a library 200 with an entry and exit port 204, a first tape cartridge 201 wherein the first tape cartridge 201 possesses a MAM 104, a MAM reader 230, 231, 232 and 234, a MAM writer 230, 231, 232 and 234, a first tape drive 224 and a second tape drive 222, a shelf system 220, and access to a memory device 240 containing a Media Lifecycle Management (MLM) data base.

Step 904 shows a step for moving the first tape cartridge 201 into the library 200 via the entry and exit port 204. The first tape cartridge 201 can be one of a plurality of tape cartridges 100 that can be imported into the library 200 via the entry and exit port 204, such as by the tape cartridge magazine 206 used to support and mobilize multiple tape cartridges 100. In one exemplary configuration, the tape cartridges 100 can be placed in a holder (not shown) in the entry and exit port 204 and moved between the shelf system 220 and the entry and exit port 204 via the transport unit 214.

Step 906 shows a step for loading the first tape cartridge 201 in the first tape drive 224 from a tape cartridge magazine 206. This can be accomplished right after the first tape cartridge 201 has been introduced into the library 200. Optionally, step 906 can be accomplished when the first tape cartridge 201 is introduced to the library 200 for the first time, the $n^{th}$ time, or sometime after the first tape cartridge 201 has been introduced to the library 200. If the first tape cartridge 201 is "deemed" faulty, it can be replaced by a spare tape cartridge. The spare tape cartridge can be one of a plurality of spare tape cartridges that are housed within the library in case a tape cartridge fails to operate properly. The spare tape cartridge can be one of a plurality of spare tape cartridges disposed in a magazine 206 dedicated with spare tape cartridges. The spare tape cartridge that replaces a failed tape cartridge can be mapped with an address that makes the spare tape cartridge identifiable to the host computer 202. Hence, the replacement tape cartridge is identifiable to the host computer 202 as the original tape cartridge that has since failed and been discarded. Any data that originally was stored on the failed tape cartridge can be stored to the replacement tape cartridge.

Step 908 shows a step for bringing the first tape cartridge 201 to a functionally ready state with the first tape drive 224 such that the first tape cartridge 201 is operable to perform data exchange operations. A functional ready state is a state wherein the first tape cartridge 201 (or any tape cartridge) is adequately loaded in a tape drive; that is, the tape cartridge 201 progresses through a series of loading sequences to "come ready", i.e., become operable to perform data exchange operations. Generally, a tape cartridge 100 is inserted in an opening in a compatible tape drive, such as the first tape drive 224, Upon entering the tape drive, an arm mechanism associated with the tape drive unlocks a spring-loaded latch associated with the tape cartridge 100, thereby enabling another device associated with the tape drive to open the tape medium access door. Spindle motor devices engage the reel or reels on which the tape medium is wound. In the case of a leader type tape structure, another mechanism associated with the tape drive grasps the tape medium leader and threads the tape through drum devices and into close proximity to tape heads associated with the tape drive used to read and write data on the tape medium. Once fully loaded, the tape cartridge is physically arranged in a condition ready to store or retrieve data for a host.

Step 910 shows a step for assessing performance of the first tape cartridge 201 based on bringing the first tape cartridge 201 to a functionally ready state. For example, some tape drives monitor substantially each task required to bring a tape cartridge to a ready state. In the event a tape cartridge fails to become functionally ready to perform data storage operations, an error code associated with the specific portion, or step, of the loading sequence is generated. In some circumstances, the error code is displayed by numbers and letters corresponding to a specific error on an LED display, such as on an LTO-5 tape drive from IBM Corp., of N.Y.

Step 912 shows a step for storing the results in one or more records from the assessment step of the first tape cartridge 201 on the MLM data base maintained by the auxiliary storage device 240 and on the MAM 104 associated with the first tape cartridge 201. The results of the assessment can correspond with an identifier associated with the first tape cartridge 201 such a serial number, for example. The assessment results can include an identification of the tape drive that was used during the assessment, the date and/or time of the assessment, an identification of the library that the tape cartridge was assessment in, and, optionally, other information beneficial to understanding parameters around the test such as temperature, power usage, humidity, and the like. If the tape cartridge passes the assessments, the tape cartridge 201 is verified "reliable" and the results can be indicated to an end user, such as through a display device associated with the library 200 (the GUI 218) or a display device elsewhere. In other words, the tape cartridge 201 can be verified as "tested and functional" either individually or by association with a larger group of tape cartridges 100 that have all been verified as "tested and functional". The passed tape cartridge 201 can then be mapped with an address so that a host computer 202 can scan the library 200 and identify the tape cartridge 201 as accessible for storage operations.

Step 914 shows a step for disposing the first tape cartridge 201 in a location in the library 200, such as the shelf system 220, which accesses operable tape cartridges 100 if the first tape cartridge 201 has passed the functional ready state. In an optional embodiment, the first tape cartridge 201 can be disposed in a magazine 206 that contains other functionally passed tape cartridges 100.

Step 916 shows a step for disposing the first tape cartridge 201 in a location in the library 200 that at least temporarily holds inoperable tape cartridges 100, such as a designated shelf area 221 of the shelf system 220, if the first tape cartridge 201 has failed the functional ready state. In an optional embodiment, the first tape cartridge 201 can be disposed in a magazine 206 that contains other failed tape cartridges 100. The failed tapes can be those that a totally inoperable or to some degree, inoperable. Optionally, tapes may be deemed inoperable it they fail to meet a threshold of operability that may be set by an end user, tape drive OEM, or a host, for example. Performing in an expected functional threshold is to perform according to pre established parameters wherein an end user, host, Original Equipment Manufacturer (OEM), for example, can set the parameters for which the reading performance must meet at a minimum.

Step 918 shows a step for removing the first tape cartridge 201 from the library 200 if the first tape cartridge 201 has failed. For example, all failed tape cartridges 100 can be removed from the library 200, such as via the exit port 204, to be analyzed or simply sent back to the manufacturer. The information of the failure criteria stored on the MAM 104 of each tape cartridge 100 can provide information about the nature of the failure of the tape cartridge 100. The MLM data base can also provide information about specific tape cartridge failures.

In an optional embodiment, the pre-use verification of the tape cartridges 100 can be performed with one or more global spare drives so as not to interrupt any on-going storage operations within a library.

In yet another aspect of the present invention, data integrity can be verified simultaneously on a tape cartridge while the data thereon is duplicated to a different storage device, such as a tape, disc drive, flash memory or the like.

Figure 10:
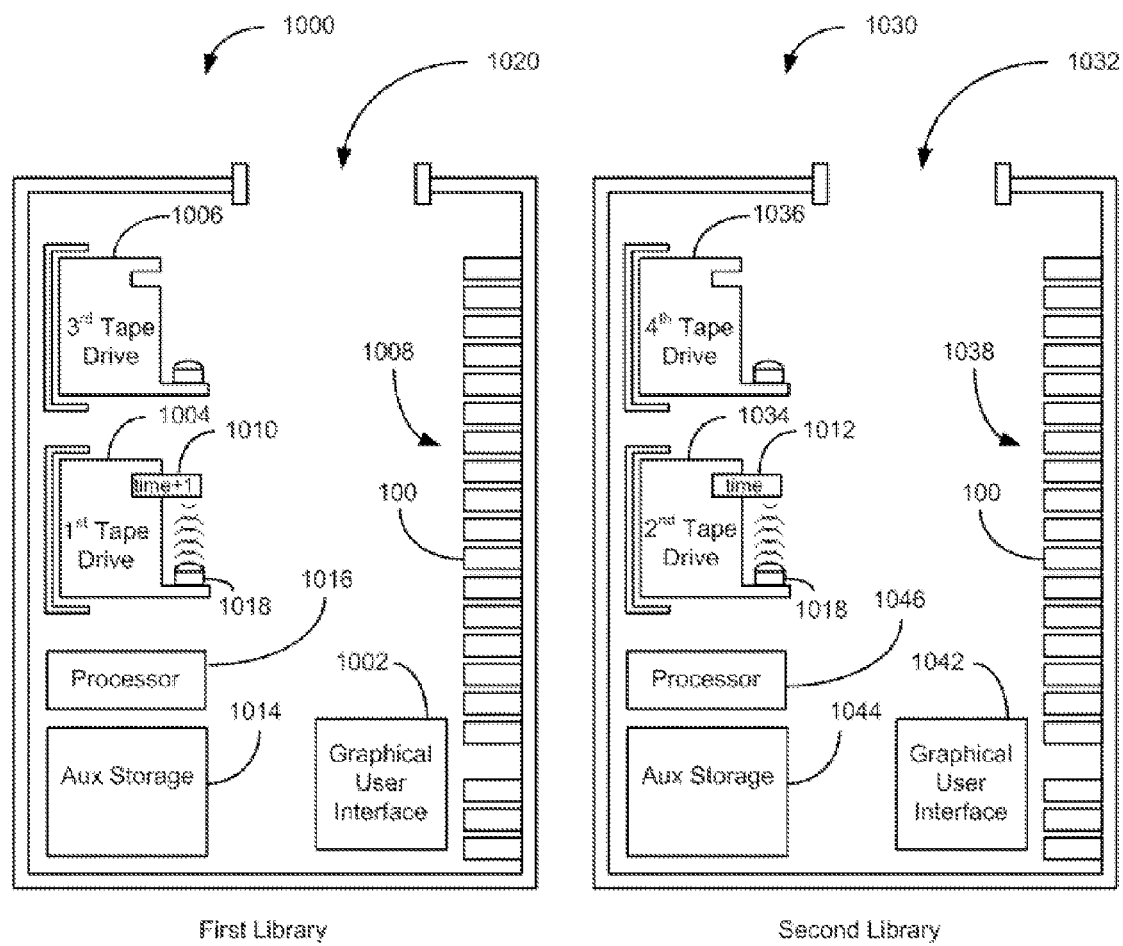
FIG. 10 is a block diagram of two libraries capable of duplicating data while assessing a tape cartridge in accordance with an embodiment of the present invention.

FIG. 10 is a block diagram of two tape library systems 1000 and 1030 that can be used illustratively to show embodiments of tape cartridge verification and data duplication. The first library 1000 possesses a first tape drive 1004 and a third tape drive 1006, both of which have a MAM reader and writer device 1018, a processor device 1016, an auxiliary storage device 1014, a plurality of tape cartridges 100 disposed in a shelf system 1008, and a graphical user interface 1002. The tape cartridges 100 can be transferred into and out from the first library 1000 via an entry and exit port 1020. Also shown loaded in the first tape drive 1004 is a first tape cartridge 1010, used herein for illustrative purposes. The second library 1030 possesses a second tape drive 1034 and a fourth tape drive 1036, both of which have a MAM reader and writer device 1018, a processor device 1046, an auxiliary storage device 1044, a plurality of tape cartridges 100 disposed in a shelf system 1038, and a graphical user interface 1042. The tape cartridges 100 can be transferred into and out from the second library 1000 via an entry and exit port 1032. Also shown loaded in the second tape drive 1034 is a second tape cartridge 1012, used herein for illustrative purposes.

Figure 11A:
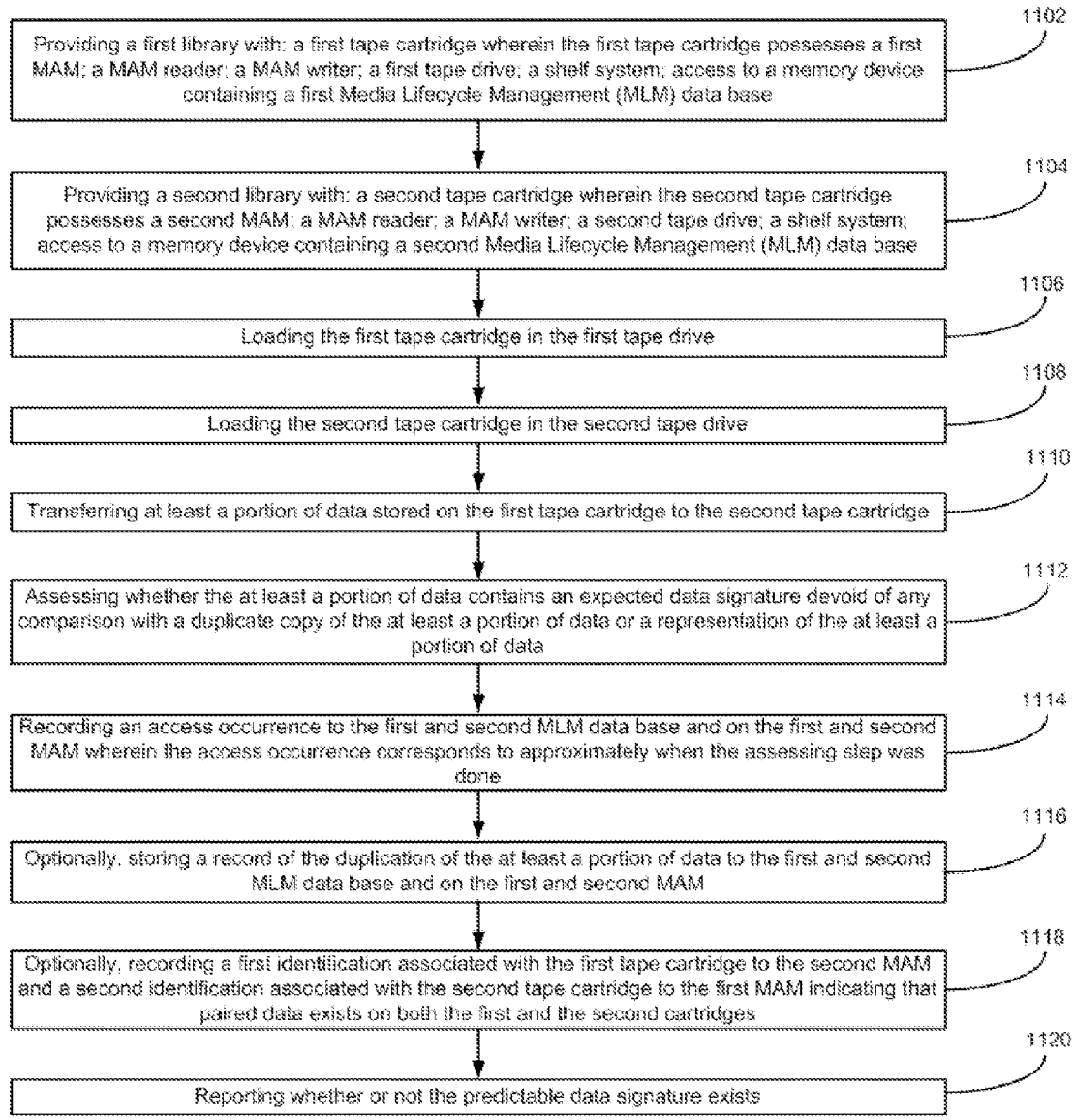
FIG. 11A is a block diagram of yet another method to practice an embodiment of the present invention.

Referring now to FIG. 11A, shown therein is a block diagram illustrating method steps to practice an embodiment of tape cartridge verification during data duplication consistent with embodiments of the present invention. It should be recognized that the steps presented in the described embodiments of the present invention do not necessarily require any particular sequence unless otherwise specified explicitly. FIG. 10 is used in conjunction with FIG. 11A for purposes of illustration in the presently described embodiment. The steps describe an embodiment consistent with the present invention of a method applicable to verifying data on a tape cartridge when at least a portion of data stored therein is transferred to a different tape cartridge. The method maintains results and other information related to the data verification on a cartridge's MAM 104, an MLM data base, or both. The MLM data base can be maintained by an auxiliary storage device 240 as shown in FIGS. 1A and 2A.

Step 1102 shows a step for providing a first library 1000 having a first tape cartridge 1010 wherein the first tape cartridge 1010 possesses a first MAM (not shown), a MAM reader 1018, a MAM writer 1018, a first tape drive 1004, a shelf system 1008, and access to an auxiliary memory device 1014 containing a first Media Lifecycle Management (MLM) data base.

Step 1104 shows a step for providing a second library 1030 having a second tape cartridge 1012, possessing a second MAM (not shown), a MAM reader 1018, a MAM writer 1018, a second tape drive 1034, a shelf system 1038, and access to an auxiliary memory device containing 1014 a second Media Lifecycle Management (MLM) data base.

Step 1106 shows a step for loading the first tape cartridge 1010 in the first tape drive 1004. This can be accomplished with a robotic transport device, such as the transport unit 214 of FIG. 2A, for example.

Step 1108 shows a step for loading the second tape cartridge 1012 in the second tape drive 1034.

Step 1110 shows a step for transferring at least a portion of data stored on the first tape cartridge 1010 to the second tape cartridge 1012. Data can be transferred between the first tape library 1000 and the second tape library 1030 via a direct connection or through an intermediary, such as a host or server, for example. The at least a portion of data can range from a small fraction of the total data maintained on the first tape cartridge 1010 to the total data maintained on the first tape cartridge 1010. Transferring the at least a portion of data can be initiated by either the first library 1000 or the second library 1030, a host, such as the host 202 of FIG. 2A, a command input on one of the GUI's 1002 or 1042 by an operator, a scheduled data transfer/duplication, or an automatic initiation when a newer generation tape cartridge is introduced to either the first library 1000 or the second library 1030, just to name several examples for prompting initiating data transfer.

Step 1112 shows a step for assessing whether the at least a portion of data contains an expected data signature devoid of any comparison with a duplicate copy of the at least a portion of data or a representation of the at least a portion of data (e.g., content analysis). That is, the assessing of data does not rely on comparing the content of known or duplicate data to the data being assessed; rather, expected data signatures or error rates indicating the presence of data is all that is assessed, as discussed in conjunction with FIGS. 7A and 7B.

Step 1114 shows a step for recording an access occurrence to the first and second MLM data base and on the first and second MAM wherein the access occurrence corresponds to approximately when the assessing step 912 was performed. This step essentially resets the time for the next data assessment (data verification) on the first MAM associated with the first tape cartridge 1010 to repeat at a time interval set by an end user or the like and sets the time that can be used for the next data assessment for the second tape cartridge 1012. Details of recording access occurrences are discussed in more detail with regard to FIGS. 7A and 7B.

Step 1116 shows an optional step for storing a record of the duplication of the at least a portion of data to the first and second MLM data base, maintained by the respective first and second auxiliary storage devices 1014 and 1044, and on the first and second MAM (not shown). For example, information indicating that the first tape cartridge 1010 has been duplicated can be stored to the first tape cartridge's MAM and the first library's MLM data base. Likewise, information indicating that the second tape cartridge 1012 possesses duplicated data can be stored to the second tape cartridge's MAM and the second library's MLM data base.

Step 1118 shows yet another optional step for recording a first identification associated with the first tape cartridge 1010 to the second MAM and recording a second identification associated with the second tape cartridge 1012 to the first MAM wherein both of the identifications are associated with indicia that paired data exists on both the first and the second cartridges 1010 and 1012. Paired data refers to an original version of data and a duplicate of the original version data. Hence, the duplicate data is paired with the original data. The first identification can be, for example, a tape cartridge serial number that is recorded to the second tape cartridge's MAM (contained in the second tape cartridge 1012) that ties or indicates, the duplication event with the first tape cartridge 1010 (or the event of duplicating a portion of the data). The second identification is recorded to the first tape cartridge's MAM and ties, or indicates, the duplication event with the second tape cartridge 1012. Hence, records can be stored on each of the tape cartridge's respective MAMs linking them to common data in which they all had possession (e.g., all the tape cartridges have stored there on a copy of at least some of the same data). Both the first MLM data base maintained by the first auxiliary memory device 1014 and the second MLM data base maintained by the second MAM device 104 can retain a record of the duplication event, the time of the event occurrence, and identities of all tape cartridges, in this case the first tape cartridge 1010 and the second tape cartridge 1012, that contain paired data. In an optional embodiment, the duplicate data can be transferred to and stored on three or more tape cartridges. Thus, the aforementioned steps can be subtly adjusted to accommodate three or more tape cartridges. In yet another embodiment, data verification (e.g., sampling read errors) can be performed on a tape medium transferring data in the simple duplication of data from one tape medium to another and a record made to each respective MAM device.

Step 1120 shows a step for reporting whether or not the predictable data signature exists. That is, the results of the assessment can be reported to a host, one or both of the GUI's 1002, 1042, a graphical display remote from the libraries 1000 and 1032, or some other location accessible to those that would utilize the results. In the event the data of the first tape cartridge 1010 is assessed to fall outside the guidelines of the expected data outcome, a warning can be issued to the end user that the first tape cartridge 1010 is unreliable and that the data duplicated on the second tape cartridge 1012 came from a failed tape cartridge. Optionally, the results of the analysis can trigger the library 1000 to isolate the first tape cartridge 1010, impose a restriction on any new data to be written to the first tape cartridge 1010 and search for a duplicate data source. Optionally, if the first tape cartridge 1010 fails in the assessment, a replacement tape cartridge 100 can be made within the first (or second) library 1000, thus, maintaining a validated paired data. Optionally, data from the first tape cartridge 1010 can undergo extreme data recovery procedures wherein any salvaged data can be stored on both the second tape cartridge 1012 and on a third tape cartridge.

The second tape cartridge 1012 well as the first tape cartridge 1010 can be set to proceed through the data assessment procedures of steps associated with FIGS. 7A and 7B, thereafter.

Optionally, the above steps can be accomplished with solely the first tape library 1000 using the first drive 1004 and the second drive 1006.

Figure 11B:
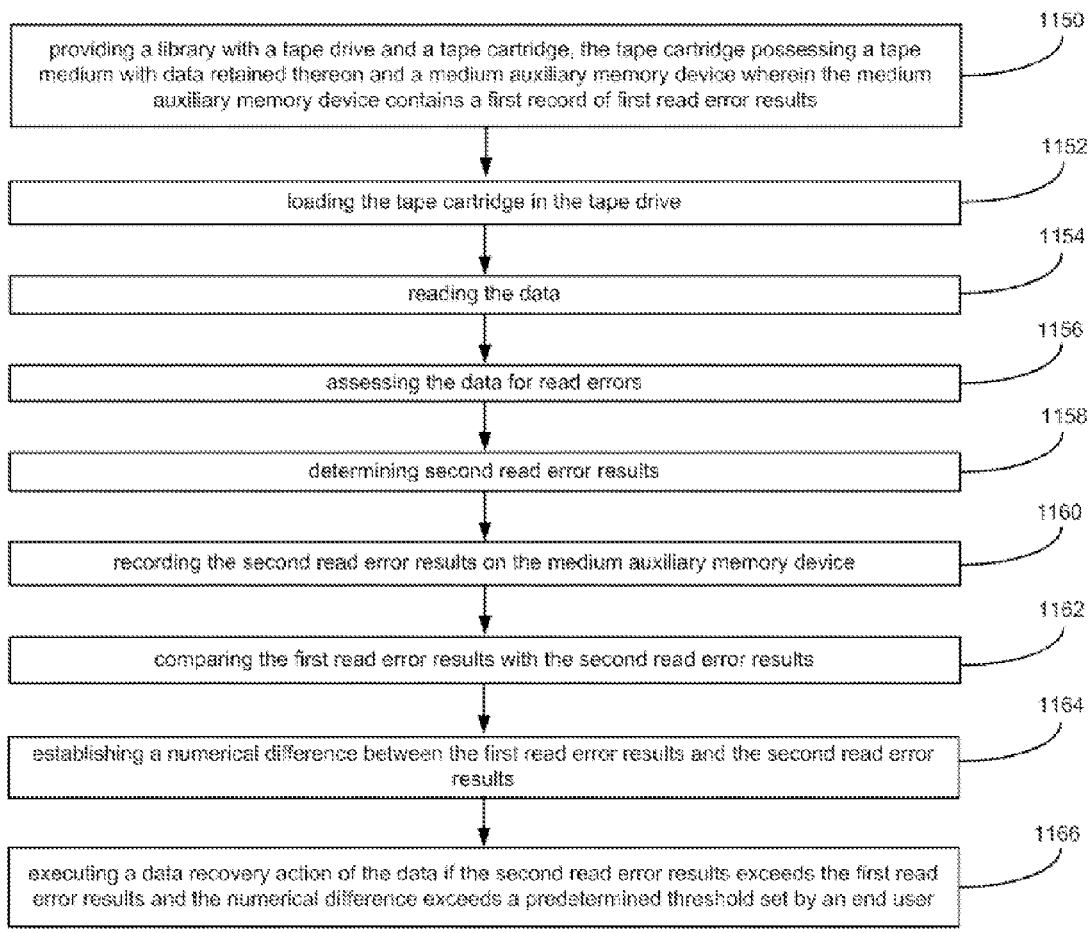
FIG. 11B is a block diagram of yet another method to practice an embodiment of the present invention.
Figure 12:
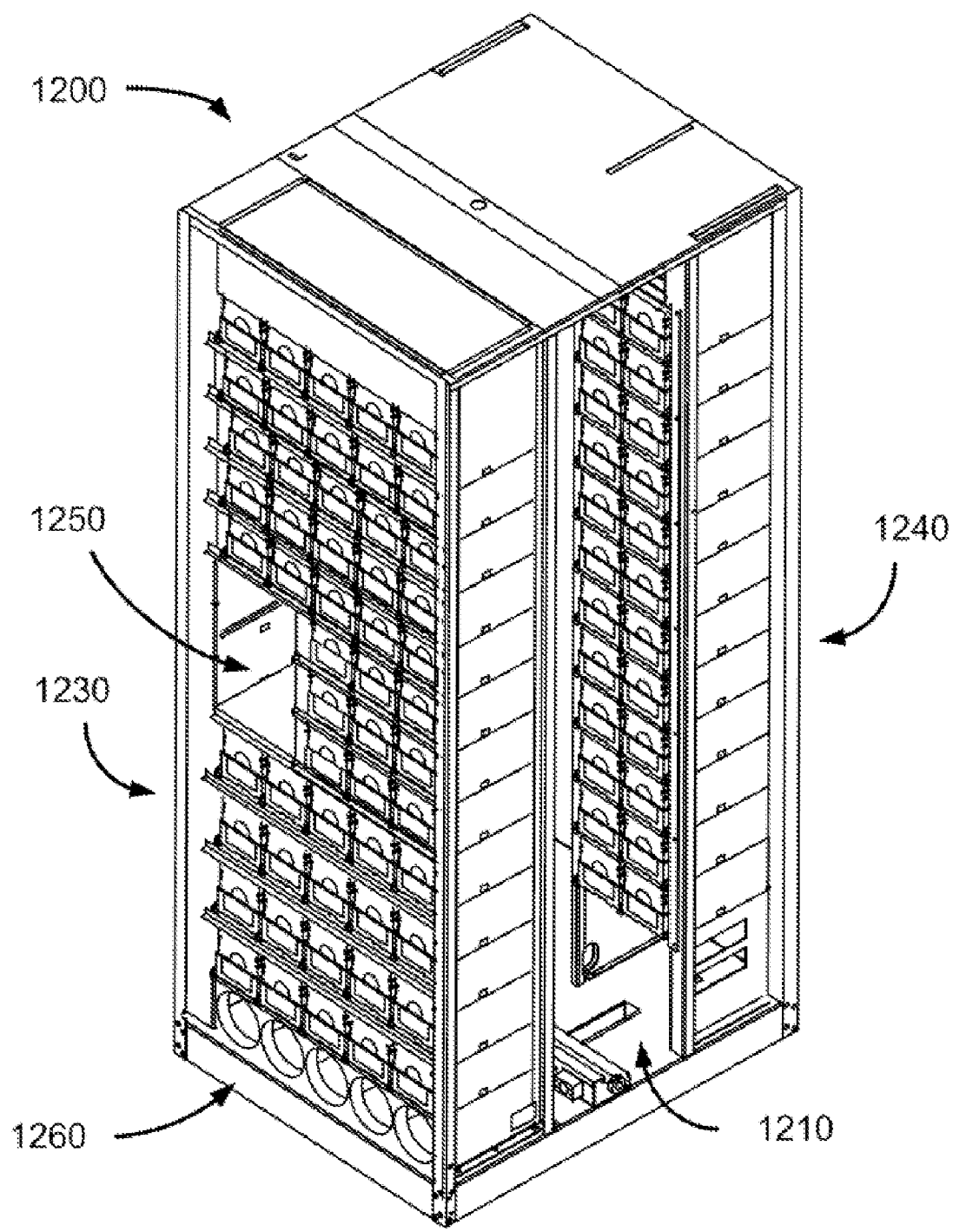
FIG. 12 shows a commercial embodiment of one T-950 library unit wherein aspects of the present invention can be practiced.

FIG. 11B is a block diagram showing an embodiment of data verification by comparing former verification assessment data consistent with embodiments of the present invention. It should be recognized that the steps presented in the described embodiments of the present invention do not necessarily require any particular sequence unless otherwise specified explicitly. FIG. 2A is used in conjunction with FIG. 11B for purposes of illustration in the presently described embodiment.

Step 1150 shows a step of providing a tape library 200 with a tape drive 224 and a tape cartridge 201, the tape cartridge 201 possesses a tape medium 102 with data retained thereon and a medium auxiliary memory device 104 wherein the medium auxiliary memory device 104 contains a record of former read error results. The read error results can be hard read errors (that are non-recoverable errors) and/or soft read errors (that can be recovered).

Step 1152 is a step of loading the tape cartridge 201 in the tape drive 201, which can be accomplished via a robot and picker device 214. The tape cartridge 201 is engaged with a tape drive in the loading operation described earlier.

Step 1154 and 1156 are steps of reading the data and assessing the data on the tape medium 102 for read errors. This is accomplished without reading the content of the data, rather it is accomplished by scanning for read errors, such as by error code correction schemes. When reading data from the tape medium 102, the tape drive 224 may register read errors, which then can increment a read error counter within the tape drive 224. A read error counter can be a memory device which is incremented when the tape drive 224 registers a read error. As discussed earlier, read errors may be soft which may include corrupted data, flipped bits, damaged media sectors, for example. Read errors may also be hard errors, or errors that are unrecoverable, such as damaged media sections. Read errors can be a combination of hard and soft errors or, optionally, be just hard or soft errors. Another manner in which to assess errors is through bit error rates, or simply error rates. Bit error rate or bit error ratio (BER) is the number of received bits that have been altered due to noise, interference and distortion, divided by the total number of transferred bits during a studied time interval. BER is a unitless performance measure, often expressed as a percentage number.

Step 1158 is a step of determining, or counting, the read errors encountered when reading the data.

Step 1160 is a step of recording the read error results on the medium auxiliary memory device 104.

Step 1162 is a step of comparing the former (older) read error results with the current read error results.

Step 1164 is a step for establishing a numerical difference between the older read error results and current read error results, assuming that there is a difference. This can be accomplished by obtaining the former record of the read error results from the MAM 104 and comparing it with the current read error results. Optionally, the former record of read error results used for comparison purposes can be obtained from the MLM data base maintained by the auxiliary storage device 240.

Step 1166 is a step of executing a data recovery action of the data if the current read error results exceed the older read error results and the numerical difference exceeds a predetermined threshold set by an end user. The data recovery action can be alerting an end user that the tape cartridge may be unreliable and next steps are needed and decided by the end user, or optionally, the data recovery action can initiate the replacement of the tape cartridge 201 with a replacement tape cartridge 100. Transferring data to the replacement tape cartridge 100 can be accomplished by any number of ways discussed above. The predetermined threshold can be set by an end user, host, user of data, operator, OEM, and the like, wherein the predetermined threshold can be a small difference in errors between the former and current assessments or a large difference depending on the comfort level of the end user. The numerical difference can be a raw number of read errors, a percentage of read errors or some other way of determining a difference based on errors registered.

In an optional embodiment, the record of former read error results and the current record of read error results can be maintained by the MAM 104 as well as the MLM data base. In yet another optional embodiment, the current record can replace the former record if the numerical difference between the two records does not reach a predetermined threshold. In any regard, the end user can receive a notification of the tape cartridge health based on the comparison of the two records (e.g., via a display screen). Optionally, more than two records can be compared to establish a trend of data degradation (if the errors increase over time) or reinforce confidence in a robust tape cartridge (if there is no or little increase in errors). The assessments can be done randomly or at a scheduled time.

In yet another embodiment of the present invention, data can be assessed to determine the quantity of data which fails to meet a readability threshold. This can be number of read errors; it can be a deviation from expected data structure, etc. The readability threshold is a threshold whereby the amount of data that is readable in a data stream must be above a user specified limit of comprehensible data.

Embodiments of the present invention can be commercially practiced in a Spectra Logic T-950 tape cartridge library manufactured by Spectra Logic of Boulder Colo. FIG. 11A shows a commercial embodiment of one T-950 library unit 1200 without an enclosure. The T-950 library 1200 comprises a first and second shelf system 1230 and 1240 that are adapted to support a plurality of the mobile media, such as the tape cartridge magazine 206 comprising a plurality of LTO-3 tape cartridges with MAMs, archived by the library 1200. The shelf systems 1230 and 1240 can each comprise at least one auxiliary memory reader, such as the auxiliary memory reader 232 of FIG. 2A. Disposed next to the second shelf system 1240 are at least four IBM LTO-3 drives adapted to write data to and read data from a tape cartridge. The IBM LTO-3 drives each have the capability of storing data to an auxiliary radio frequency memory device 104 contained in an LTO-3 cartridge. Functionally interposed between the first and second shelf system 1230 and 1240 is a magazine transport space 1210. The magazine transport space 1210 is adapted to provide adequate space for a tape cartridge magazine 206 to be moved, via a magazine transport and cartridge picker (not shown), from a position in the first shelf system 1230, for example, to a drive. The magazine transport and picker can further accommodate at least one auxiliary radio frequency memory device reader, such as the reader 234 from FIG. 2A. Tape cartridge magazines 206 can be transferred into and out from the T-950 library 1200 via an entry/exit port 1250. Transferring tape cartridge magazines 206 in and out of the T-950 library 1200 can be accomplished by an operator for example. The T-950 library 1200 comprises a means for cooling as shown by the fans 1260, located at the base of the library 1200. The T-950 library 1200 can be linked to a central data base, such as the data base 602, wherein the central data base can provide storage of all of the auxiliary radio frequency memory devices, such as the device 104, contained in each tape cartridge in the T-950 library 1200 as read by any one of the auxiliary radio frequency memory device readers. The T-950 library also comprises a library controller (not shown) that can function as the processor device 241 in addition to an auxiliary storage device 240, such as a disk drive (or plurality of disk drives), of FIGS. 3A-3C. The T-950 library 1200 also provides a graphical user interface (not shown) whereon a display of assessment results or, in an alternative embodiment, simple messages pertaining a user-specified action associated with a tape cartridge, can be displayed, such as an alert accompanying a sound alarm or recommendations for further action/s, for example.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple, or all tapes in a library, can be managed in the tape validation process for example, while still maintaining substantially the same functionality without departing from the scope and spirit of the present invention. Another example can include using these techniques across multiple library partitions, while still maintaining substantially the same functionality without departing from the scope and spirit of the present invention. Further, though communication is described herein as between a client and the library, such as the library 201, communication can be received directly by a drive, such as the first drive 218, via the interface device 230, for example, without departing from the scope and spirit of the present invention. Further, for purposes of illustration, a first and second drive and tape cartridges are used herein to simplify the description for a plurality of drives and tape cartridges. Finally, although the preferred embodiments described herein are directed to tape drive systems, such as the tape cartridges and tape storage systems, such as a tape library and tape drives, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method for certifying data, the method comprising:
providing a library with a tape drive and a tape cartridge, said tape cartridge possessing a tape medium with data retained thereon and a medium auxiliary memory device wherein said medium auxiliary memory device contains a first record of first read error results;
loading said tape cartridge in said tape drive;
reading said data;
assessing said data for read errors;
determining second read error results;
recording said second read error results on said medium auxiliary memory device;
comparing said first read error results with said second read error results;
establishing a numerical difference between said first read error results and said second read error results;
executing a data recovery action of said data if said second read error results exceeds said first read error results and said numerical difference exceeds a predetermined threshold set by an end user.

2. The method of claim 1 wherein said data recovery action consists essentially of alerting an end user that said tape cartridge may be unreliable.

3. The method of claim 1 wherein said data recovery action consists essentially of replacing said tape cartridge with a replacement tape cartridge.

4. The method of claim 1 further comprising maintaining said first record and said second record in a data base wherein said first read error results are obtained via said data base for said comparison.

5. The method of claim 1 wherein said first read error results are obtained via said medium auxiliary memory device for said comparison.

6. The method of claim 1 wherein said read errors essentially consist of hard read errors and soft read errors.

7. The method of claim 1 wherein said read error results essentially consist of a percentage of the number of said read errors to the amount of said data.

8. The method of claim 1 further comprising transmitting to and end user a tape health notification according to comparison results wherein said comparison results are based on said numerical difference.

9. The method of claim 1 further comprising replacing said first read error results with said second read error results if said numerical difference does not exceed said predetermined threshold.

10. The method of claim 1 wherein said data recovery action is also executed if said second read error results exceed a second predetermined threshold set by an end user.

11. The method of claim 1 wherein said data assessed is a fraction of all data retained on said tape medium.

12. A method for certifying data retained by a tape cartridge in a tape library, the method comprising:
reading said data;
assessing the quantity of said data that fails to meet a readability threshold;
recording new results of said quantity to a medium auxiliary memory device associated with said tape cartridge;
comparing said new results with former results of a former assessment, said former assessment ascertaining an former quantity of said data that failed to meet said readability threshold from an earlier time;
establishing a numerical difference of said quantity and said former quantity; and
executing a data recovery action if said new results exceeds results of said former assessment and said numerical difference exceeds a predetermined threshold set by an end user.

13. The method of claim 12 wherein said reading step is performed at a scheduled time.

14. The method of claim 12 wherein said action consists essentially of alerting an end user that said tape cartridge may be unreliable.

15. The method of claim 12 wherein said predetermined threshold is set by an end user.

16. The method of claim 12 wherein said action consists essentially of replacing said tape cartridge with a replacement tape cartridge and storing a copy of said data to said replacement tape cartridge.

17. The method of claim 12 further comprising maintaining said new results and said former results in a data base wherein said former results are obtained via said data base as used in said comparing step.

18. The method of claim 12 wherein said former results are obtained via said medium auxiliary memory device as used in said comparing step.

19. The method of claim 12 wherein said quantity of said data that fails to meet a readability threshold is related to the number of hard read errors and soft read errors.

20. A method for certifying data retained by a tape cartridge in a tape library, the method comprising:

accounting for an error rate of read errors encountered when said tape cartridge is being read by a tape drive wherein said tape cartridge is essentially not being read for data content retrieval;

storing a record of said error rate in a medium auxiliary memory device associated with said tape cartridge;

accessing an older record containing a formerly accounted for error rate of read errors when said tape cartridge was formerly read;

comparing said record with said older record;

determining if there is a difference between said error rate and said formerly accounted for error rate;

executing a data recovery action if said record of said error rate exceeds said older record of said formerly accounted for error rate and said difference exceeds a predetermined threshold set by an end user.

* * * * *